(12) United States Patent
Laroche et al.

(10) Patent No.: US 11,743,487 B2
(45) Date of Patent: *Aug. 29, 2023

(54) METHOD, DEVICE, AND COMPUTER PROGRAM FOR OPTIMIZING TRANSMISSION OF MOTION VECTOR RELATED INFORMATION WHEN TRANSMITTING A VIDEO STREAM FROM AN ENCODER TO A DECODER

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/751,343

(22) Filed: May 23, 2022

(65) Prior Publication Data
US 2022/0286705 A1 Sep. 8, 2022

Related U.S. Application Data

(63) Continuation of application No. 17/145,910, filed on Jan. 11, 2021, now Pat. No. 11,375,229, which is a
(Continued)

(30) Foreign Application Priority Data
Mar. 14, 2014 (GB) ........................ 1404663

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/147* (2014.11); *H04N 19/176* (2014.11)

(58) Field of Classification Search
CPC .... H04N 19/52; H04N 19/105; H04N 19/147; H04N 19/176
(Continued)

(56) References Cited

U.S. PATENT DOCUMENTS

2007/0223588 A1* 9/2007 Lee .................. H04N 19/56
375/240.16
2012/0224635 A1* 9/2012 Kim .................. H04N 19/46
375/240.16
(Continued)

*Primary Examiner* — Jae N Noh
(74) *Attorney, Agent, or Firm* — Canon U.S.A., Inc. IP Division

(57) ABSTRACT

The invention relates to the encoding or decoding of at least one portion of an image by predicting the at least one portion using at least one predictor, the at least one predictor being determined as a function of at least one reference image portion and as a function of values of a plurality of items of motion information. After having obtained a value of a first item of the plurality of items, a value of a second item is evaluated as a function of the obtained value of the first item, the second item being an item of the plurality of items and being distinct from the first item. Next, the at least one predictor is determined as a function of the at least one reference image portion and as a function of the first and second items.

11 Claims, 21 Drawing Sheets

Related U.S. Application Data continuation of application No. 16/725,955, filed on Dec. 23, 2019, now Pat. No. 10,917,658, which is a continuation of application No. 16/203,425, filed on Nov. 28, 2018, now Pat. No. 10,560,715, which is a continuation of application No. 14/657,651, filed on Mar. 13, 2015, now abandoned.

(51) Int. Cl.
*H04N 19/176* (2014.01)
*H04N 19/147* (2014.01)

(58) Field of Classification Search
USPC ..................................................... 375/240.16
See application file for complete search history.

(56) References Cited

U.S. PATENT DOCUMENTS

| | | | |
|---|---|---|---|
| 2013/0156335 A1* | 6/2013 | Lim ........................ | H04N 19/52 |
| | | | 382/238 |
| 2014/0254687 A1* | 9/2014 | Kondo ................. | H04N 19/523 |
| | | | 375/240.16 |
| 2015/0195562 A1* | 7/2015 | Li ........................ | H04N 19/523 |
| | | | 375/240.02 |

* cited by examiner

METHOD, DEVICE, AND COMPUTER PROGRAM FOR OPTIMIZING TRANSMISSION OF MOTION VECTOR RELATED INFORMATION WHEN TRANSMITTING A VIDEO STREAM FROM AN ENCODER TO A DECODER

This application is a continuation, and claims the benefit, of U.S. patent application Ser. No. 17/145,910, filed on Jan. 11, 2021, which is a continuation of U.S. patent application Ser. No. 16/725,955, filed on Dec. 23, 2019, now U.S. Pat. No. 10,917,658, which is a continuation, and claims the benefit, of U.S. patent application Ser. No. 16/203,425, filed on Nov. 28, 2018, now U.S. Pat. No. 10,560,715, which is a continuation, and claims the benefit of U.S. patent application Ser. No. 14/657,651, filed on Mar. 13, 2015, and claims the benefit of, and priority to, United Kingdom Patent Application No. 1404663.5, filed on Mar. 14, 2014 and entitled "Method, device, and computer program for optimizing transmission of motion vector related information when transmitting a video stream from an encoder to a decoder". The above cited patent applications are incorporated herein by reference in their entirety.

FIELD OF THE INVENTION

The invention generally relates to the field of video coding and decoding, in particular to video coding and decoding that would extend the High Efficiency Video Coding (HEVC) standard. More particularly, the invention concerns a method, device, and computer program for optimizing transmission of motion vector related information when transmitting a video stream from an encoder to a decoder.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code.

Common standardized approaches have been adopted for the format and method of the coding process, especially with respect to the decoding part. For example, a video encoding format being standardized is High Efficiency Video Coding (HEVC), wherein each video image is split into macroblocks called Coding Units (CU) that are partitioned and adjusted according to the characteristics of the original image segment under consideration. This allows more detailed coding of areas of the video image which contain relatively more information and less coding effort for those areas with fewer features.

The video images were originally processed by coding each macroblock individually, in a manner resembling the digital coding of still images or pictures. Later coding models allow for prediction of the features in one frame, either from neighboring macroblocks (spatial prediction), or by association with a similar macroblock in a neighboring frame (temporal prediction). This allows use of already available coded information, thereby shortening the amount of coding bit-rate needed overall. Differences between the source area and the area used for prediction are captured in a residual set of values which themselves are encoded in association with the code for the source area. Many different types of predictions are possible. Effective coding chooses the best model to provide image quality upon decoding, while taking account of the bit-stream size each model requires to represent an image in the bit-stream. A trade-off between the decoded picture quality and reduction in required bitrate, also known as compression of the data, is the overall goal.

There exists a continuous need to increase the value of this trade-off for increasing the visual quality of the decoded images while decreasing the required bandwidth to transmit the encoded images.

SUMMARY OF THE INVENTION

Faced with these constraints, the inventors provide a method and a device for optimizing transmission of motion vector related information when transmitting a video stream from an encoder to a decoder.

It is a broad object of the invention to remedy the shortcomings of the prior art as described above.

According to a first aspect of the invention there is provided a method for encoding or decoding at least one portion of an image by predicting the at least one portion using at least one predictor, the at least one predictor being determined as a function of at least one reference image portion and as a function of values of a plurality of items of motion information, the method comprising:

obtaining a value of a first item of the plurality of items;

evaluating a value of a second item as a function of the obtained value of the first item, the second item being an item of the plurality of items and being distinct from the first item;

determining the at least one predictor as a function of the at least one reference image portion and as a function of the first and second items.

Accordingly, the claimed method improves the coding efficiency of video images and reduces the global run time complexity requested at the encoder end for decoding received video images, in particular when the video images comprise screen content.

For example, evaluating the value of the second item may consist in computing the value as a function of the obtained value of the first item, may consist in choosing a value from among a set of one or several values (e.g. predetermined values, received values, or computed values) as a function of the obtained value of the first item, or may consist in a combination thereof.

In an embodiment, the method further comprises a step of obtaining a value of a third item, the third item being an item of the plurality of items and being distinct from the first and the second item, the step of evaluating the value of the second item as a function of the obtained value of the first item being carried out as a function of the obtained value of the third item.

In an embodiment, the third item comprises a prediction mode of which the value indicates that the at least one portion and the at least one reference image portion belong to at least two different images.

In an embodiment, the plurality of items comprises at least one motion vector, the first item comprising a resolution of the at least one motion vector.

In an embodiment, the plurality of items comprises at least one motion vector and wherein the second item comprises a number of motion vector predictors used to predict the at least one motion vector.

In an embodiment, the number of motion vector predictors decreases when the resolution of the at least one motion vector decreases.

In an embodiment, the method further comprises a step of obtaining the number of motion vector predictors if the obtained value of the first item is equal to a predetermined value.

In an embodiment, the second item comprises a number of reference lists from which the at least one predictor is derived.

In an embodiment, the number of reference lists from which the at least one predictor is derived decreases when the resolution of the at least one motion vector decreases.

In an embodiment, the second item comprises a prediction mode.

In an embodiment, the first item comprises a prediction mode.

In an embodiment, the plurality of items comprises at least one motion vector and wherein the second item comprises a number of motion vector predictors used to predict the at least one motion vector.

In an embodiment, the second item comprises a number of reference lists from which the at least one predictor is derived.

In an embodiment, the plurality of items comprises at least one motion vector, the second item comprising a resolution of the at least one motion vector.

In an embodiment, the second item comprises a reference frame index.

In an embodiment, the step of obtaining the value of the first item comprises a step of setting the value of the first item to a predetermined value if the value of the first item is not received along with encoded data.

In an embodiment, the step of evaluating the value of the second item as a function of the obtained value of the first item comprises a step of obtaining a value of a third item if the obtained value of the first item is equal to a predetermined value, the third item being an item of the plurality of items and being distinct from the first and the second item, the value of the second item being evaluated as a function of the obtained value of the third item.

In an embodiment, the value of the second item is chosen from among a set of obtained values as a function of the obtained value of the first item.

In an embodiment, the value of the second item is associated with one prediction unit of the at least one portion.

In an embodiment, the second item is associated with one prediction unit of the at least one portion or with a plurality of prediction units of a plurality of portions of the image depending on a coding mode.

In an embodiment, the encoding or decoding conforms the HEVC standard

A second aspect of the invention provides a method for encoding or decoding at least a first portion and a second portion of an image by predicting the first and the second portions using predictors, the predictors being determined as a function of at least one reference image and as a function of motion vectors, the at least one reference image being distinct from the image to which belongs the first and second portions, a first resolution of motion vectors being associated with a prediction unit of the first portion and a second resolution of motion vectors being associated with a prediction unit of the second portion, the first resolution being different from the second resolution, the method comprising:

obtaining motion vector information;

evaluating at least one first motion vector associated with the first portion and at least one second motion vector associated with the second portion, as a function of the obtained motion vector information; and determining at least one first predictor for the first portion and at least one second predictor for the second portion.

Accordingly, the claimed method improves the coding efficiency of video images and reduces the global run time complexity requested at the encoder end for decoding received video images, in particular when the video images comprise screen content.

In an embodiment, at least one motion vector predictor used to evaluate the at least one first motion vector is not rounded.

In an embodiment, at least one motion vector predictor used to evaluate the at least one first motion vector is not rounded when no residual motion vector value associated with the at least one motion vector predictor is used to evaluate the at least one first motion vector.

In an embodiment, a number of first motion vector predictors used to predict the first portion is determined as a function of the first motion vector resolution.

In an embodiment, a number of reference frame indexes used to predict the first portion is determined as a function of the first motion vector resolution.

In an embodiment, a prediction mode used to predict the first portion is determined as a function of the first motion vector resolution.

In an embodiment, the first motion vector resolution, a number of reference frame indexes used to predict the first portion, and/or a number of reference frame indexes used to predict the first portion are determined as a function of a prediction mode.

In an embodiment, the first resolution is different from the second resolution only for the Adaptive Motion Vector Prediction mode.

In an embodiment, the encoding or decoding conforms the HEVC standard.

A third aspect of the invention provides a device for encoding or decoding at least one portion of an image by predicting the at least one portion using at least one predictor, the at least one predictor being determined as a function of at least one reference image portion and as a function of values of a plurality of items of motion information, the device comprising at least one microprocessor configured for carrying out the steps of:

obtaining a value of a first item of the plurality of items;

evaluating a value of a second item as a function of the obtained value of the first item, the second item being an item of the plurality of items and being distinct from the first item;

determining the at least one predictor as a function of the at least one reference image portion and as a function of the first and second items.

Accordingly, the claimed device improves the coding efficiency of video images and reduces the global run time complexity requested at the encoder end for decoding received video images, in particular when the video images comprise screen content.

For example, evaluating the value of the second item may consist in computing the value as a function of the obtained value of the first item, may consist in choosing a value from among a set of one or several values (e.g. predetermined values, received values, or computed values) as a function of the obtained value of the first item, or may consist in a combination thereof.

In an embodiment, the at least one microprocessor is further configured for carrying out the step of obtaining a value of a third item, the third item being an item of the plurality of items and being distinct from the first and the second item, the step of evaluating the value of the second item as a function of the obtained value of the first item being carried out as a function of the obtained value of the third item.

In an embodiment, the third item comprises a prediction mode of which the value indicates that the at least one portion and the at least one reference image portion belong to at least two different images.

In an embodiment, the plurality of items comprises at least one motion vector, the first item comprising a resolution of the at least one motion vector.

In an embodiment, the plurality of items comprises at least one motion vector and wherein the second item comprises a number of motion vector predictors used to predict the at least one motion vector.

In an embodiment, the at least one microprocessor is further configured so that the number of motion vector predictors decreases when the resolution of the at least one motion vector decreases.

In an embodiment, the at least one microprocessor is further configured for carrying out the step of obtaining the number of motion vector predictors if the obtained value of the first item is equal to a predetermined value.

In an embodiment, the second item comprises a number of reference lists from which the at least one predictor is derived.

In an embodiment, the at least one microprocessor is further configured so that the number of reference lists from which the at least one predictor is derived decreases when the resolution of the at least one motion vector decreases.

In an embodiment, the second item comprises a prediction mode.

In an embodiment, the first item comprises a prediction mode.

In an embodiment, the plurality of items comprises at least one motion vector and wherein the second item comprises a number of motion vector predictors used to predict the at least one motion vector.

In an embodiment, the second item comprises a number of reference lists from which the at least one predictor is derived.

In an embodiment, the plurality of items comprises at least one motion vector, the second item comprising a resolution of the at least one motion vector.

In an embodiment, the second item comprises a reference frame index.

In an embodiment, the at least one microprocessor is further configured so that the step of obtaining the value of the first item comprises a step of setting the value of the first item to a predetermined value if the value of the first item is not received along with encoded data.

In an embodiment, the at least one microprocessor is further configured so that the step of evaluating the value of the second item as a function of the obtained value of the first item comprises a step of obtaining a value of a third item if the obtained value of the first item is equal to a predetermined value, the third item being an item of the plurality of items and being distinct from the first and the second item, the value of the second item being evaluated as a function of the obtained value of the third item.

In an embodiment, the at least one microprocessor is further configured so that the value of the second item is chosen from among a set of obtained values as a function of the obtained value of the first item.

In an embodiment, the at least one microprocessor is further configured so that the value of the second item is associated with one prediction unit of the at least one portion.

In an embodiment, the at least one microprocessor is further configured so that the second item is associated with one prediction unit of the at least one portion or with a plurality of prediction units of a plurality of portions of the image depending on a coding mode.

A fourth aspect of the invention provides a device for encoding or decoding at least a first portion and a second portion of an image by predicting the first and the second portions using predictors, the predictors being determined as a function of at least one reference image and as a function of motion vectors, the at least one reference image being distinct from the image to which belongs the first and second portions, a first resolution of motion vectors being associated with a prediction unit of the first portion and a second resolution of motion vectors being associated with a prediction unit of the second portion, the first resolution being different from the second resolution, the device comprising at least one microprocessor configured for carrying out the steps of:

obtaining motion vector information;

evaluating at least one first motion vector associated with the first portion and at least one second motion vector associated with the second portion, as a function of the obtained motion vector information; and determining at least one first predictor for the first portion and at least one second predictor for the second portion.

Accordingly, the claimed device improves the coding efficiency of video images and reduces the global run time complexity requested at the encoder end for decoding received video images, in particular when the video images comprise screen content.

In an embodiment, the at least one microprocessor is further configured so that at least one motion vector predictor used to evaluate the at least one first motion vector is not rounded.

In an embodiment, the at least one microprocessor is further configured so that at least one motion vector predictor used to evaluate the at least one first motion vector is not rounded when no residual motion vector value associated with the at least one motion vector predictor is used to evaluate the at least one first motion vector.

In an embodiment, the at least one microprocessor is further configured so that a number of first motion vector predictors used to predict the first portion is determined as a function of the first motion vector resolution.

In an embodiment, the at least one microprocessor is further configured so that a number of reference frame indexes used to predict the first portion is determined as a function of the first motion vector resolution.

In an embodiment, the at least one microprocessor is further configured so that a prediction mode used to predict the first portion is determined as a function of the first motion vector resolution.

In an embodiment, the at least one microprocessor is further configured so that the first motion vector resolution, a number of reference frame indexes used to predict the first portion, and/or a number of reference frame indexes used to predict the first portion are determined as a function of a prediction mode.

In an embodiment, the at least one microprocessor is further configured so that the first resolution is different from the second resolution only for the Adaptive Motion Vector Prediction mode.

In an embodiment, the encoding or decoding conforms the HEVC standard.

A fifth and a sixth aspect of the invention provide a video encoder and a video decoder comprising the device described above.

Accordingly, the claimed encoder and decoder improve the coding efficiency of video images and reduces the global run time complexity requested at the encoder end for decoding received video images, in particular when the video images comprise screen content.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which.

DETAILED DESCRIPTION OF EMBODIMENTS OF THE INVENTION

According to a general aspect of an embodiment of the invention, an item of information used for encoding a particular feature of coded data of an image, for example motion vector resolution information or a coding mode, is used to define another particular feature of coded data of the image such as a number of predictors used to predict a motion vector, the number of reference frames, or a prediction mode.

Therefore, according to a particular aspect of the invention, a number of predictors as determined within AMVP or Merge modes is determined as a function of a motion vector resolution flag. Still according to a particular aspect of the invention, a number of reference frames or a prediction mode is determined as a function of a motion vector resolution flag. Still according to particular aspects of the invention, a number of predictors as determined within AMVP or Merge modes, a number of reference frames or a prediction mode is determined as a function of a coding mode.

As a consequence, the coding efficiency can be improved, in particular when encoding and decoding screen content.

Figure 1:
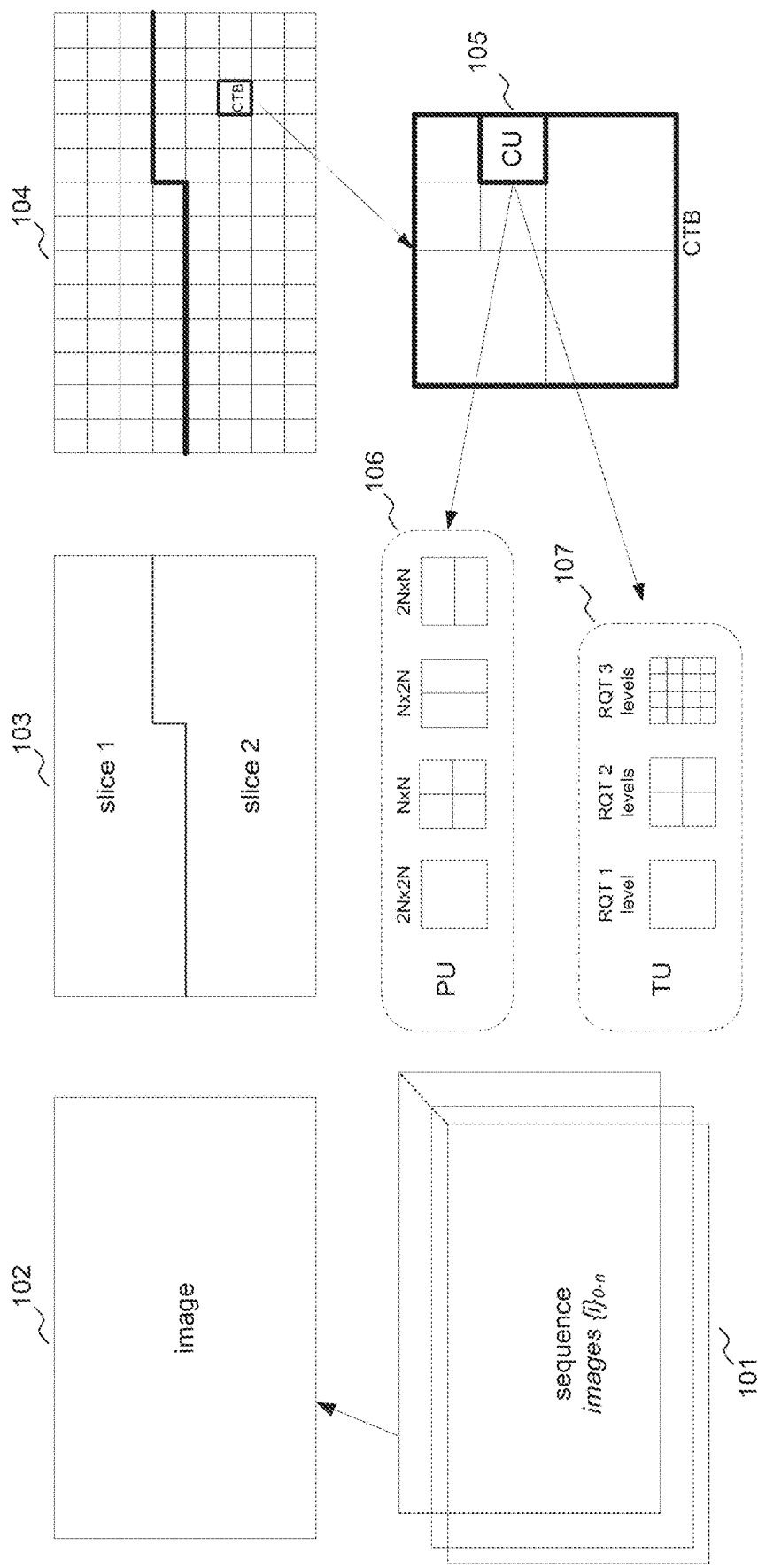
FIG. 1 schematically illustrates an example of data structure used in HEVC.

FIG. 1 illustrates an example of coding structure used in HEVC. According to HEVC and one of its previous predecessors, the original video sequence 101 is a succession of digital images "images i". A digital image is represented by one or more matrices the coefficients of which represent pixels.

It should be noted that the word "image" should be broadly interpreted as video images in the following. For instance, it designates the pictures (or frames) in a video sequence.

The images 102 are divided into slices 103. A slice is a part of the image or the entire image. In HEVC these slices are divided into non-overlapping Largest Coding Units (LCUs), also referred to as Coding Tree Blocks (CTB) 104, generally blocks of size 64 pixels×64 pixels. Each CTB may in its turn be iteratively divided into smaller variable size Coding Units (CUs) 105 using a quadtree decomposition. Coding units are the elementary coding elements and are constituted of two sub-units which are Prediction Units (PU) and Transform Units (TU) of maximum size equal to the CU's size. The prediction Units correspond to the partition of the CU for prediction of pixel values. Each CU can be further partitioned into a maximum of 4 square Partition Units or 2 rectangular Partition Units 106. Transform units are used to represent the elementary units that are spatially transformed with DCT (standing for Discrete Cosine Transform). A CU can be partitioned in TU based on a quadtree representation (107).

Each slice is embedded in one NAL unit. In addition, the coding parameters of the video sequence are stored in dedicated NAL units referred to as parameter sets. In HEVC and H.264/AVC two kinds of parameter set NAL units are employed: first, the Sequence Parameter Set (SPS) NAL unit which comprises all parameters that are unchanged during the whole video sequence. Typically, it handles the coding profile, the size of the video frames and other parameters. Secondly, Picture (Image) Parameter Sets (PPS) code the different values that may change from one frame to another.

In summary, in HEVC, specific syntax headers or parameter sets are defined for the different levels:

video level: a Video Parameter Set (VPS) is defined to specify the structure of the video; a video is made of several layers, corresponding to several versions of the same content, for instance such as different views of the same scene, different spatial resolutions of the same view; the VPS specifies the layered structure of the video content;

sequence level: a Sequence Parameter Set (SPS) is defined to specify the structure of the sequence; in particular it defines the spatial resolution of the images, the frame rate, the chroma format, the bit-depth of luma and chroma samples; an SPS refers to a VPS via a VPS id.

image level: a Picture (Image) Parameter Set (PPS) is defined to specify a set of features relating to images of the sequence; parameters such as the default luma and chroma quantization parameters, the weighted prediction usage, the tiles usage, the loop filtering parameters are signalled in the PPS; a PPS refers to an SPS via an SPS id.

slice level: a Slice Header (referred to as in the HEVC specification as Slice Segment Header) is defined to specify a set of features relating to the Slice of the image; similarly to the PPS, it specifies specific settings for the coding tools, such as the slice type (intra, inter), the reference images used for the temporal prediction, the activation of coding tools, the number and structure of tiles composing the slice; a Slice Segment Header refers to a PPS via a PPS id.

Coding tools are the different processes that apply in the coding/decoding processes. For instance, intra coding, inter coding, motion compensation, transform, quantization, entropy coding, or deblocking filtering are coding tools. Coding modes relate to coding tools and correspond to different available parameterizations of these coding tools. For simpler terminology, it is considered that both terms are equivalent and can be used in the same way.

Figure 2:
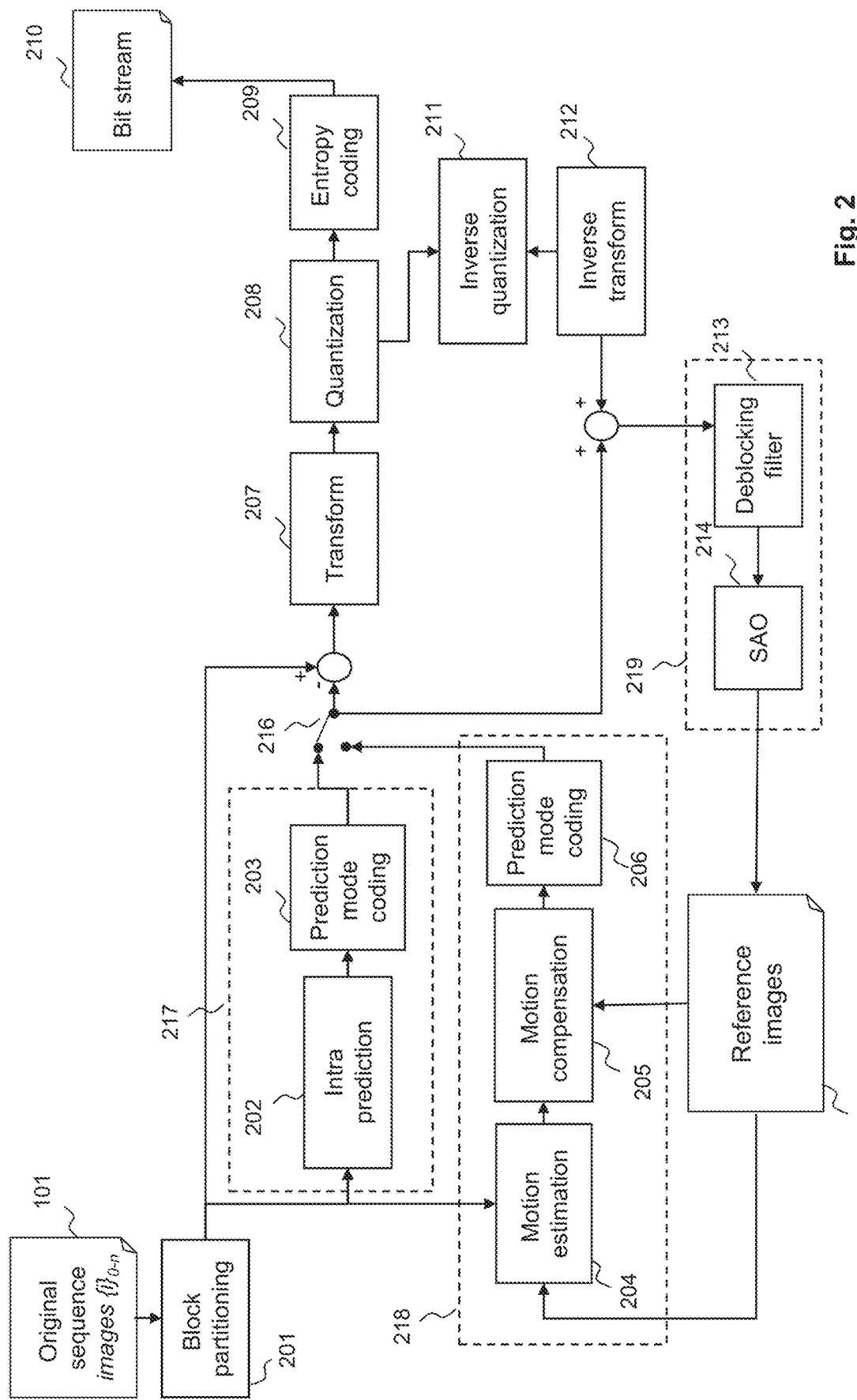
FIG. 2 illustrates the architecture of an example of an HEVC video encoder.

FIG. 2 illustrates a schematic diagram of an example of an HEVC video encoder.

Each frame of the original video sequence 101 is first divided into blocks of pixels (i.e. coding units) in a module referenced 201 and a coding mode is attributed to each block. There exist two types of coding mode, the modes based on a spatial prediction (e.g. the Intra mode) and the modes based on a temporal prediction (e.g. the Inter, bi-directional, and skip modes).

The subdivision of the largest coding units (LCUs) into coding units (CUs) and the partitioning of the coding units into transform units (TUs) and prediction units (PUs) is determined as a function of a rate distortion criterion. Each prediction unit of the coding unit being processed is predicted spatially by an "Intra" predictor during a step carried out in a module referenced 217 or temporally by an "Inter" predictor during a step carried out by a module referenced 218. Each predictor is a block of pixels issued from the same image (i.e. the processed image) or another image, from which a difference block (or "residual") is derived. Thanks to the identification of a predictor block and coding of the residual, it is possible to reduce the quantity of information actually to be encoded.

The encoded frames are of two types: temporally predicted frames (either predicted from one reference frame called P-frames or predicted from two reference frames called B-frames) and non-temporally predicted frames (called Intra frames or I-frames). In I-frames, only Intra prediction is considered for coding coding units and prediction units. In P-frames and B-frames, Intra and Inter prediction are considered for coding coding units and prediction units.

In the "Intra" prediction processing module 217, the current block is predicted by means of an "Intra" predictor that is to say a block of pixels constructed from the information already encoded in the current image. More precisely, the module 202 determines an intra prediction mode that is to be used to predict pixels from the neighbouring PU pixels. In HEVC, up to 35 intra prediction modes are considered.

A residual block is obtained by computing the difference between the intra predicted block and the current block of pixels. An intra-predicted block therefore comprises a prediction mode and a residual. The coding of the intra prediction mode is inferred from the neighbours prediction units' prediction mode. This process for inferring a prediction mode, carried out in module 203, enables reduction of the coding rate of the intra prediction mode. The Intra prediction processing module also uses the spatial dependencies of the frame either for predicting the pixels but also to infer the intra prediction mode of the prediction unit.

With regard to the second processing module 218 that is directed to "Inter" coding, two prediction types are possible. The first prediction type referred to as mono-prediction and denoted P-type consists of predicting a block by referring to one reference block from one reference image. The second prediction type referred to as bi-prediction (B-type) consists in predicting a block by referring to two reference blocks from one or two reference images.

An estimation of motion between the current prediction unit and blocks of pixels of reference images 215 is made in module 204 in order to identify, in one or several of these reference images, one (P-type) or several (B-type) blocks of pixels to be used as predictors to encode the current block. In cases where several predictors are to be used (B-type), they are merged to generate a single prediction block. It is to be recalled that reference images are images in a video sequence that have already been coded and then reconstructed (by decoding).

The reference block is identified in the reference frame by a motion vector (MV) that is equal to the displacement between the prediction unit in the current frame and the reference block. After having determined a reference block, the difference between the prediction block and current block is computed in module 205 of processing module 218 carrying out the inter prediction process. This block of differences represents the residual of the inter predicted block. At the end of the inter prediction process, the current PU is composed of one motion vector and a residual.

Thanks to spatial dependencies of movements between neighbouring prediction units, HEVC provides a method to predict a motion vector for each prediction unit. To that end, several types of motion vector predictors are employed (generally two types, one of the spatial type and one of the temporal type). Typically, the motion vector associated with the prediction units located on the top, the left, and the top left corner of the current prediction unit form a first set of spatial predictors. A temporal motion vector candidate is generally also used. It is typically the one associated with the collocated prediction unit in a reference frame (i.e. the prediction unit at the same coordinate). According to the HEVC standard, one of the predictors is selected based on a criterion that minimizes the difference between the motion vector predictor and the motion vector associated with the current prediction unit. According to the HEVC standard, this process is referred to as AMVP (standing for Adaptive Motion Vector Prediction).

After having been determined, the motion vector of the current prediction unit is coded in module 206, using an index that identifies the predictor within the set of motion vector candidates and a motion vector difference (MVD) between the prediction unit motion vector and the selected motion vector candidate. The Inter prediction processing module relies also on spatial dependencies between motion information of prediction units to increase the compression ratio of inter predicted coding units.

The spatial coding and the temporal coding (modules 217 and 218) thus supply several texture residuals (i.e. the difference between a current block and a predictor block) which are compared to each other in module 216 for selecting the best coding mode that is to be used.

The residual obtained at the end of the inter or intra prediction process is then transformed in module 207. The transform applies to a transform unit that is included in a coding unit. A transform unit can be further split into smaller transform units using a so-called Residual QuadTree decomposition (RQT). According to the HEVC standard, two or three levels of decompositions are generally used and authorized transform block sizes are 32×32, 16×16, 8×8, and 4×4. The transform function is derived from a discrete cosine transform DCT.

The residual transformed coefficients are then quantized in module 208 and the coefficients of the quantized transformed residual are coded by means of entropy coding in module 209 to be added in compressed bit-stream 210. Coding syntax elements are also coded in module 209. This entropy coding module uses spatial dependencies between syntax elements to increase the coding efficiency.

In order to calculate the "Intra" predictors or to make an estimation of the motion for the "Inter" predictors, the encoder performs a decoding of the blocks already encoded. This is done by means of a so-called "decoding" loop carried out in modules 211, 212, 213, and 214. This decoding loop makes it possible to reconstruct blocks and images from quantized transformed residuals.

According to the decoding loop, a quantized transformed residual is dequantized in module 211 by applying an inverse quantization that corresponds to the inverse of the one provided in module 208. Next, the residual is reconstructed in module 212 by applying the inverse transform of the transform applied in module 207.

On the one hand, if the residual comes from an "Intra" coding, that is to say from module 217, the "Intra" predictor used is added to the decoded residual in order to recover a reconstructed block corresponding to the original processed block (i.e. the block lossy modified by transform and quantization modules 207 and 208).

On the other hand, if the residual comes from an "Inter" coding module 218, the blocks pointed to by the current motion vectors (these blocks belong to the reference images 215 referred by the current image indices) are merged before being added to the processed received residual.

A final loop filter processing module 219 is used to filter the reconstructed residuals in order to reduce the effects resulting from heavy quantization of the residuals and thus, reduce encoding artefacts. According to the HEVC standard, several types of loop filters are used among which the deblocking filter and sample adaptive offset (SAO) carried out in modules 213 and 214, respectively. The parameters used by these filters are coded and transmitted to the decoder using a header of the bit stream, typically a slice header.

The filtered images, also called reconstructed images, are stored as reference images 215 in order to allow the subsequent "Inter" predictions to take place during the compression of the following images of the current video sequence.

In the context of HEVC, it is possible to use several reference images 215 for the estimation of motion vectors and for motion compensation of blocks of the current image. In other words, the motion estimation is carried out on a set of several images. Thus, the best "Inter" predictors of the current block, for the motion compensation, are selected in some of the multiple reference images. Consequently two adjoining blocks may have two predictor blocks that come from two distinct reference images. This is in particular the reason why, in the compressed bit stream, the index of the reference image (in addition to the motion vector) used for the predictor block is indicated.

The use of multiple reference images (the Video Coding Experts Group recommends limiting the number of reference images to four) is useful for withstanding errors and improving the compression efficiency.

It is to be noted that the resulting bit stream 210 of the encoder 200 comprises a set of NAL units that corresponds to parameter sets and coding slices.

Figure 3:
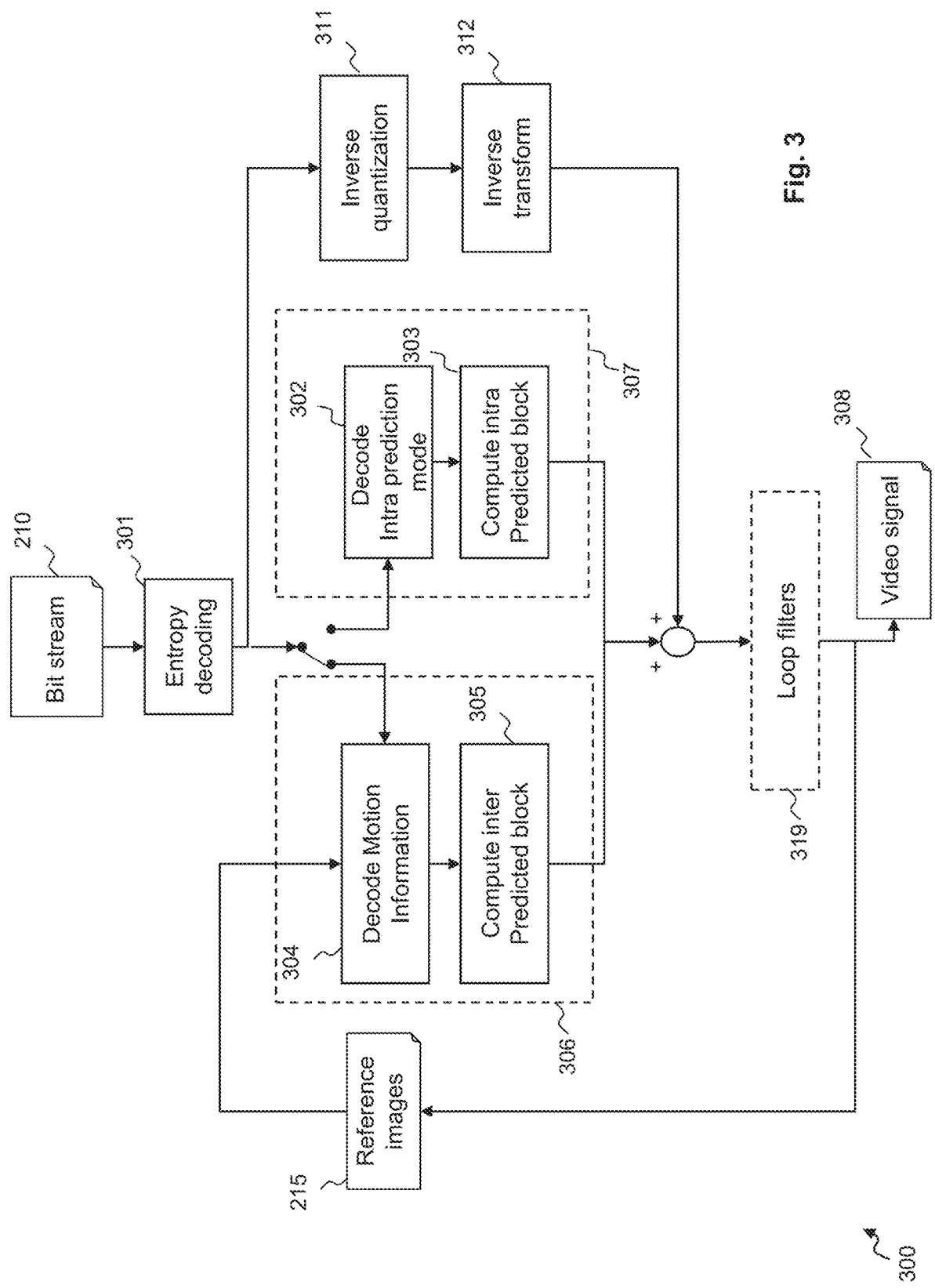
FIG. 3 illustrates the architecture of an example of an HEVC video decoder.

FIG. 3 illustrates a schematic diagram of a video decoder of the HEVC type. The illustrated decoder 300 receives as an input a bit stream, for example the bit stream 210 corresponding to video sequence 101 compressed by encoder 200 of the HEVC type as described by reference to FIG. 2.

During the decoding process, the bit stream 210 is parsed in an entropy decoding module 301. This processing module uses the previously entropy decoded elements to decode the encoded data. In particular, it decodes the parameter sets of the video sequence to initialize the decoder. It also decodes largest coding units of each video frame. Each NAL unit that corresponds to coding slices are then decoded.

The partition of a current largest coding unit is parsed and the subdivisions of coding units, prediction units, and transform units are identified. The decoder successively processes each coding unit in intra processing module 307 or inter processing module 306 and in inverse quantization module 311, inverse transform module 312, and loop filter processing module 319.

It is to be noted that inverse quantization module 311, inverse transform module 312, and loop filter processing module 319 are similar to inverse quantization module 211, inverse transform module 212, and loop filter processing module 219 as described by reference to FIG. 2.

The "Inter" or "Intra" prediction mode for the current block is parsed from the bit stream 210 in parsing process module 301. Depending on the prediction mode, either intra prediction processing module 307 or inter prediction processing module 306 is selected to be used.

If the prediction mode of the current block is "Intra" type, the prediction mode is extracted from the bit stream and decoded with the help of neighbours' prediction modes in module 304 of intra prediction processing module 307. The intra predicted block is then computed in module 303 with the decoded prediction mode and the already decoded pixels at the boundaries of current prediction unit. The residual associated with the current block is recovered from the bit stream and then entropy decoded in module 301.

On the contrary, if the prediction mode of the current block indicates that this block is of the "Inter" type, the motion information is extracted from the bit stream and decoded in module 304 and the AMVP process is carried out. Motion information of the neighbouring prediction units already decoded is also used to compute the motion vector of the current prediction unit. This motion vector is used in the reverse motion compensation module 305 in order to determine the "Inter" predictor block contained in the reference images 215 of the decoder 300. In a similar way to what is done in the encoder, the reference images 215 are composed of images that precede the image currently being decoded and that are reconstructed from the bit stream (and therefore decoded previously).

A following decoding step consists in decoding a residual block corresponding to the current coding unit, that has been transmitted in the bit stream. The parsing module 301 extracts the residual coefficients from the bit stream and performs successively an inverse quantization in module 311 and an inverse transform in module 312 to obtain the residual block. This residual block is added to the predicted block obtained at output of the intra or inter processing module.

After having decoded all the blocks of a current image, loop filter processing module 319 is used to eliminate block effects and to reduce encoding artefacts in order to obtain reference images 215. Like the encoder and as described by reference to FIG. 2, loop filter processing module 319 may comprise a deblocking filter and sample adaptive offset.

As illustrated, the decoded images are used as an output video signal 308 of the decoder, which can then be displayed.

As mentioned above, the transform carried out in module 207 and the inverse transform carried out in modules 212 and 312 can apply to blocks having a size varying from 4×4 to 32×32. It is also possible to skip the transform for 4×4 blocks when it turns out that the transformed coefficients are more costly to encode than the non-transformed residual signal (this is known as the Transform-Skip mode).

As mentioned above, Inter prediction can be unidirectional or bi-directional in the current HEVC design. Unidirectional refers to one predictor block being used to predict the current block. The one predictor block is defined by a list index, a reference frame index and a motion vector. The list index corresponds to a list of reference frames. It may be considered, for example, that two lists are used: L0 and L1. One list contains at least one reference frame and a reference frame can be included in both lists. A motion vector has two components: horizontal and vertical. The motion vector corresponds to the spatial displacement in terms of pixels between the current block and the temporal predictor block in the reference frame. Thus, the block predictor for the uni-directional prediction is the block from the reference frame (ref index) of the list, pointed to by the motion vector.

For bi-directional Inter prediction, two block predictors are considered. One for each list (L0 and L1). Consequently, two reference frame indexes are considered as well as two motion vectors. The Inter block predictor for bi-prediction is the average, pixel by pixel, of the two blocks pointed to by these two motion vectors.

The motion information dedicated to the Inter block predictor can be defined by the following parameters:
- an Inter prediction type: unidirectional or bidirectional prediction type;
- one or two lists of index:
  - unidirectional prediction: L0 or L1;
  - bidirectional prediction: L0 and L1;
- one or two reference frame indexes:
  - unidirectional prediction: RefL0 or RefL1;
  - bidirectional prediction: RefL0 and RefL1; and
- one or two motion vectors:
  - unidirectional prediction: one motion vector having two components mvx (horizontal component) and mvy (vertical component);
  - bidirectional prediction: two motion vectors each having two components mvx (horizontal component) and mvy (vertical component);

It may be noted that the bi-directional Inter predictor may only be used for a B type frame type. Inter prediction in B frames can be uni or bi-directional. In P frames, the Inter prediction is only unidirectional.

As mentioned above, the current design of HEVC uses three different modes for temporal prediction (the AMVP mode, Merge mode and Merge Skip mode), the main difference between these modes being the data signaled in the bit-stream.

In the AMVP mode all data are explicitly signaled. This means that the texture residual is coded and inserted into the bit-stream (the texture residual is the difference between the current block and the Inter prediction block). For the motion information, all data are coded. Thus, the direction type is coded (uni or bi-directional). The list index, if needed, is also coded and inserted into the bit-stream. The related reference frame indexes are explicitly coded and inserted into the bit-stream. The motion vector value is predicted by the selected motion vector predictor. The motion vector residual for each component is then coded and inserted into the bit-stream.

In the Merge mode, the texture residual and the predictor index are coded and inserted into the bit-stream. The motion vector residual, direction type, list or reference frame index are not coded. These motion parameters are derived from the predictor index. Thus, the predictor, referred to as candidate, is the predictor of all data of the motion information.

In the Merge Skip mode no information is transmitted to the decoder side except for the "mode" itself and the predictor index. In this mode the processing is similar to the Merge mode except that no texture residual is coded or transmitted. The pixel values of a Merge Skip block are the pixel values of the block predictor.

The design of the derivation of predictors and candidate is very important to achieve coding efficiency without large impact on complexity. According to HEVC standard, two motion vector derivations are used: one for Inter mode (AMVP), described by reference to FIGS. 3 and 4, and one for Merge modes (Merge derivation process), described by reference to FIGS. 3 and 5.

AMVP exploits spatial and temporal correlation of motion vectors from neighboring blocks to derive the predictor for the current motion vector. AMVP first scans the motion vectors from spatial blocks located on the left side and top side of the current block and then temporal neighboring block positions in some specified locations (typically bottom right and center of the collocated block, i.e. the block at the same position in the temporal frame as the current block in the current frame) and orders construction of a motion vector predictor list. Next, the encoder selects the best predictor from the list for the current coding motion vector and codes the corresponding index indicating the chosen predictor, as well as the motion vector difference, in the bit-stream.

Figures 4, 7:
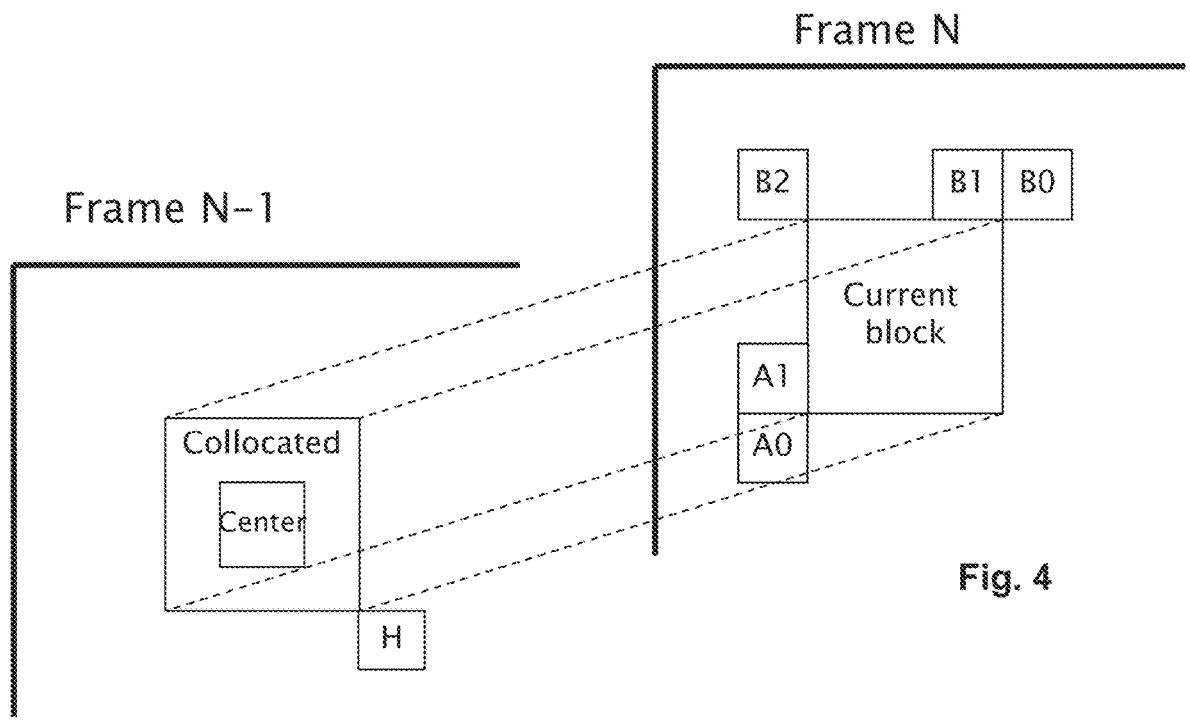
FIG. 4 illustrates spatial and temporal blocs that can be used to generate motion vector predictors in AMVP and Merge modes of HEVC coding and decoding systems.
FIG. 7 illustrates the principle of the sub-pixel interpolation to estimate a block predictor.
Figure 5:
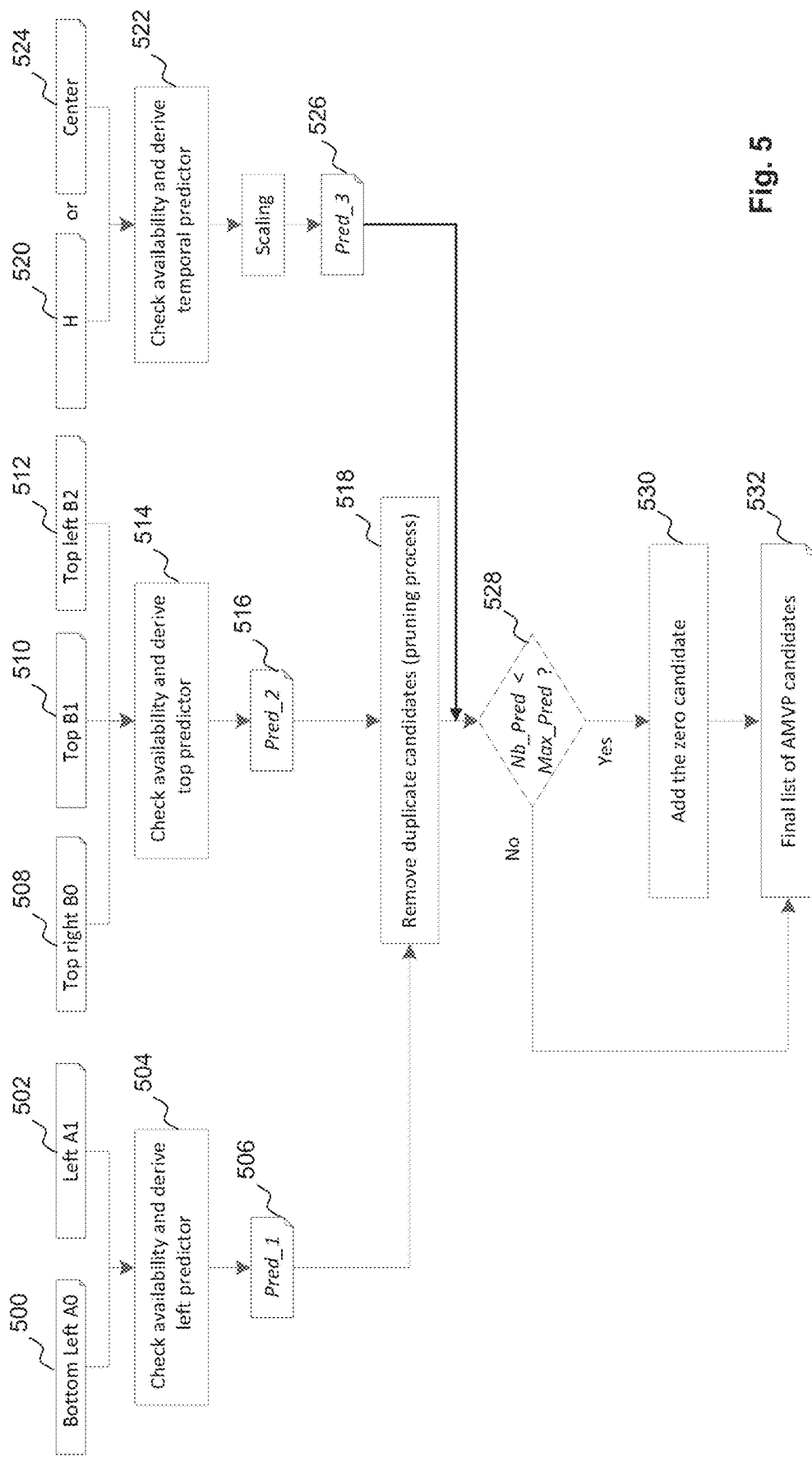
FIG. 5 shows simplified steps of the process of the AMVP predictor set derivation.

FIG. 4 illustrates spatial and temporal blocks that can be used to generate motion vector predictors in AMVP and Merge modes of HEVC coding and decoding systems and FIG. 5 shows simplified steps of the process of the AMVP predictor set derivation.

Two predictors, i.e. the two spatial motion vectors of the AMVP mode, are chosen among the top blocks and the left blocks including the top corner blocks and left corner block and one predictor is chosen from among the bottom right block and center block of the collocated block as represented in FIG. 4.

Turning to FIG. 5, a first step aims at selecting a first spatial predictor (Pred_1, 506) from among the bottom left blocks A0 and A1, of which the spatial positions are illustrated in FIG. 4. To that end, these blocks are selected (500, 502) one after another, in the given order, and, for each selected block, following conditions are evaluated (504) in the given order, the first block for which one of the condition is fulfilled being set as a predictor:

the motion vector is from the same reference list and the same reference image;
the motion vector is from the other reference list and the same reference image;
the scaled motion vector is from the same reference list and a different reference image; or
the scaled motion vector is from the other reference list and a different reference image.

If no value is found, the left predictor is considered as being unavailable. In this case, this indicates that the related blocks were Intra coded or that those blocks do not exist.

A following step aims at selecting a second spatial predictor (Pred_2, 516) from among the top right block B0, top block B1, and top left block B2, of which the spatial positions are illustrated in FIG. 4. To that end, these blocks are selected (508, 510, 512) one after another, in the given order, and, for each selected block, the above mentioned conditions are evaluated (514) in the given order, the first block for which one of the above mentioned conditions are fulfilled being set as a predictor.

Again, if no value is found, the top predictor is considered as being unavailable. In this case, this indicates that the related blocks were Intra coded or that those blocks do not exist.

In a next step (518), the two predictors, if both are available, are compared with each other to remove one of them if they are equal (i.e. same motion vector values, same reference list, same reference index and the same direction type).

If only one spatial predictor is available, the algorithm looks for a temporal predictor in a following step.

The temporal motion predictor (Pred_3, 526) is derived as follows: the bottom right (H, 520) position of the collocated block in a previous frame is first considered in the availability check module 522. If it does not exist or if the motion vector predictor is not available, the center of the collocated block (Center, 524) is selected to be checked. These temporal positions (Center and H) are illustrated in FIG. 4.

The motion predictor value is then added to the set of predictors.

Next, the number of predictors (Nb_Pred) is compared (528) to the maximum number of predictors (Max_Pred). As mentioned above, the maximum number of predictors (MAX_Pred) of motion vector predictors that the derivation process of AMVP needs to generate is two in the current version of the HEVC standard.

If this maximum number is reached, the final list or set of AMVP predictors (532) is built. Otherwise, a zero predictor is added (530) to the list. The zero predictor is a motion vector equal to (0,0).

As illustrated in FIG. 5, the final list or set of AMVP predictors (532) is built from a subset of spatial motion predictors (500 to 512) and from a subset of temporal motion predictors (520, 524).

As mentioned above, a motion predictor candidate of Merge mode or of Merge Skip mode represents all the required motion information: direction, list, reference frame index, and motion vectors. An indexed list of several candidates is generated by a merge derivation process. In the current HEVC design the maximum number of candidates for both Merge modes is equal to five (4 spatial candidates and 1 temporal candidate).

Figure 6:
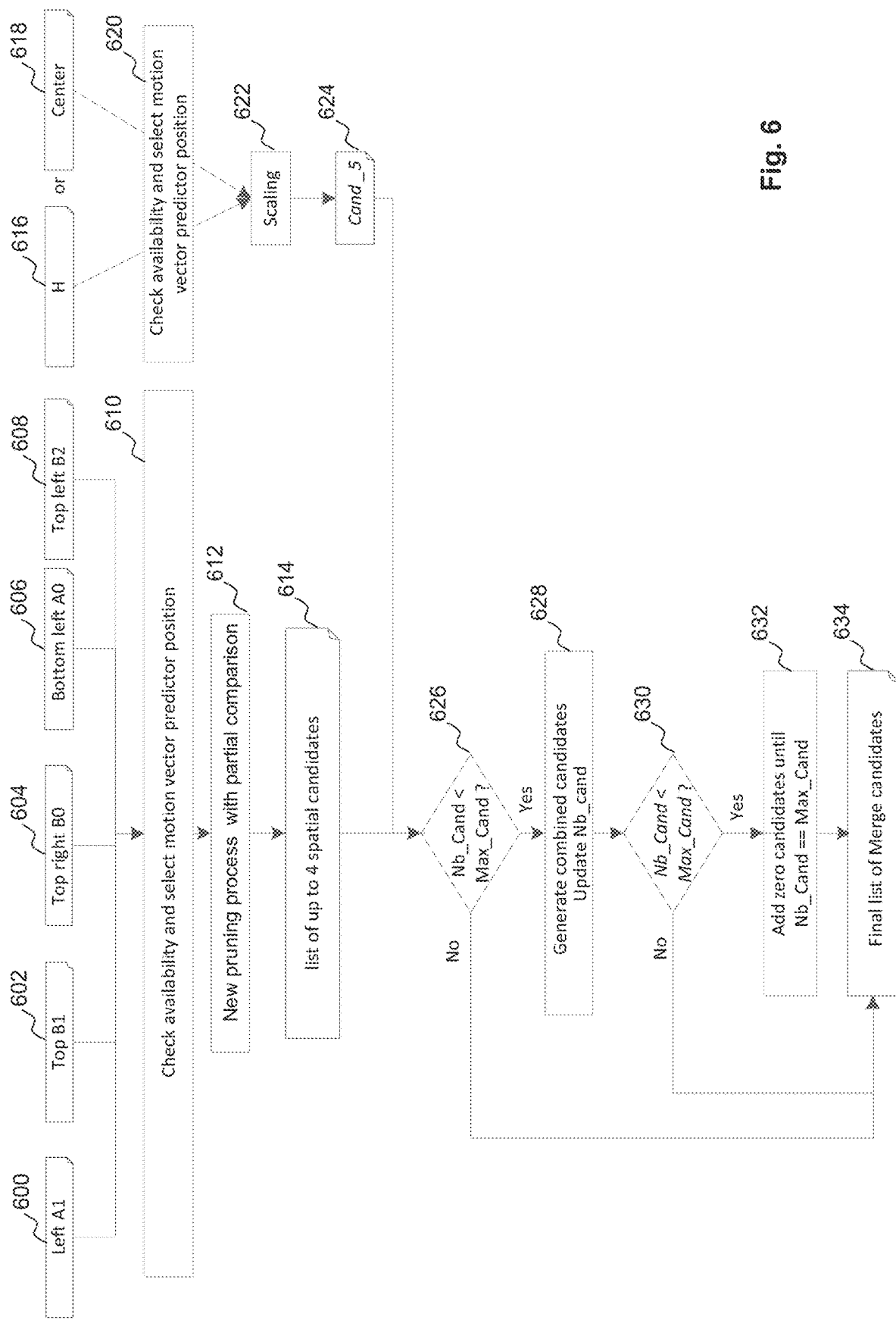
FIG. 6 is a diagram of a motion vector derivation process of the Merge modes.

FIG. 6 is a diagram of a motion vector derivation process of the Merge modes. In a first step of the derivation process, five block positions are considered (600 to 608). These positions are the spatial positions illustrated in FIG. 4 with references A1, B1, B0, A0, and B2. In a following step, the availability of the spatial motion vectors is checked and at most five motion vectors are selected (610). A predictor is considered as available if it exists and if the block is not Intra coded. Therefore, selecting the motion vectors corresponding to the five blocks as candidates is done according to the following conditions:

if the "left" motion vector A1 (600) is available (610), i.e. if it exists and if this block is not Intra coded, the motion vector of the "left" block is selected and used as a first candidate in the list of candidates (614);
if the "top" motion vector B1 (602) is available (610), the candidate "top" block motion vector is compared to "left" motion vector A1 (612), if it exists. If motion vector B1 is equal to motion vector A1, B1 is not added to the list of spatial candidates (614). On the contrary, if motion vector B1 is not equal to motion vector A1, B1 is added to the list of spatial candidates (614);
if the "top right" motion vector B0 (604) is available (610), the motion vector of the "top right" is compared to motion vector B1 (612). If motion vector B0 is equal to motion vector B1, motion vector B0 is not added to the list of spatial candidates (614). On the contrary, if motion vector B0 is not equal to motion vector B1, motion vector B0 is added to the list of spatial candidates (614);

if the "bottom left" motion vector A0 (606) is available (610), the motion vector of the "bottom left" is compared to motion vector A1 (612). If motion vector A0 is equal to motion vector A1, motion vector A0 is not added to the list of spatial candidates (614). On the contrary, if motion vector A0 is not equal to motion vector A1, motion vector A0 is added to the list of spatial candidates (614); and if the list of spatial candidates doesn't contain four candidates, the availability of "top left" motion vector B2 (608) is checked (610). If it is available, it is compared to motion vector A1 and to motion vector B1. If motion vector B2 is equal to motion vector A1 or to motion vector B1, motion vector B2 is not added to the list of spatial candidates (614). On the contrary, if motion vector B2 is not equal to motion vector A1 or to motion vector B1, motion vector B2 is added to the list of spatial candidates (614).

At the end of this stage, the list of spatial candidates comprises up to four candidates.

For the temporal candidate, two positions can be used: the bottom right position of the collocated block (616, denoted H in FIG. 4) and the center of the collocated block (618). These positions are illustrated in FIG. 4.

As for the AMVP motion vector derivation process, a first step aims at checking (620) the availability of the block at the H position. Next, if it is not available, the availability of the block at the center position is checked (620). If at least one motion vector of these positions is available, the temporal motion vector can be scaled (622), if needed, to the reference frame having index 0, for both list L0 and L1, in order to create a temporal candidate (624) which is added to the list of Merge motion vector predictor candidates. It is positioned after the spatial candidates in the list.

If the number (Nb_Cand) of candidates is strictly less (626) than the maximum number of candidates (Max_Cand that value is signaled in the bit-stream slice header and is equal to five in the current HEVC design) and if the current frame is of the B type, combined candidates are generated (628). Combined candidates are generated based on available candidates of the list of Merge motion vector predictor candidates. The generation mainly consists in combining the motion vector of one candidate of the list L0 with the motion vector of one candidate of list L1.

If the number (Nb_Cand) of candidates remains strictly less (630) than the maximum number of candidates (Max_Cand), zero motion candidates are generated (632) until the number of candidates of the list of Merge motion vector predictor candidates reaches the maximum number of candidates.

At the end of this process, the list or set of Merge motion vector predictor candidates is built (634).

As illustrated in FIG. 6, the list or set of Merge motion vector predictor candidates is built (634) from a subset of spatial candidates (600 to 608) and from a subset of temporal candidates (616, 618).

The Merge mode is applied at the prediction unit (PU) level. The size of a prediction unit associated with the Merge mode (in the Inter mode) can be equal to the size of a coding unit (i.e. 2N×2N). Moreover, the size of a prediction unit associated with the Merge Skip mode is always 2N×2N (i.e. the size of a coding unit). At the encoder end, one candidate is selected for each prediction unit associated with the Merge mode and the corresponding index is inserted in the bit-stream. According to the HEVC standard, this index is coded with a unary max code where only the first bit depends on a CABAC context (CABAC stands for Context-Adaptive Binary Arithmetic Coding3 which is an entropy coding method). This means that this first bit is binarized according to a probability. The other bits are binarized with an equi-probability. The maximum value of this unary max depends on a transmitted value in the slice header. According to the current HEVC standard, the unary max value cannot exceed five.

In the HEVC standard, the motion vector resolution used is the quarter-pixel (denoted quarter pel for short), as in several of its predecessors. This means that interpolated blocks can be used to estimate a block predictor in a motion compensation step. In the HEVC standard, such an interpolation is obtained with the DCTIF filters (DCT-based interpolation filter). The use of the sub-pixel resolution increases the precision of the motion compensation.

FIG. 7 illustrates the principle of the sub-pixel interpolation to estimate a block predictor. For the sake of illustration, the pixel values are referenced using uppercase letters while interpolated pixel values, corresponding to the sub-pixel resolution, are referenced using lowercase letters. According to the illustrated example (illustrating quarter pel interpolation), each component of a motion vector is four times larger than those of the pixels in the video sequence.

Figure 8:
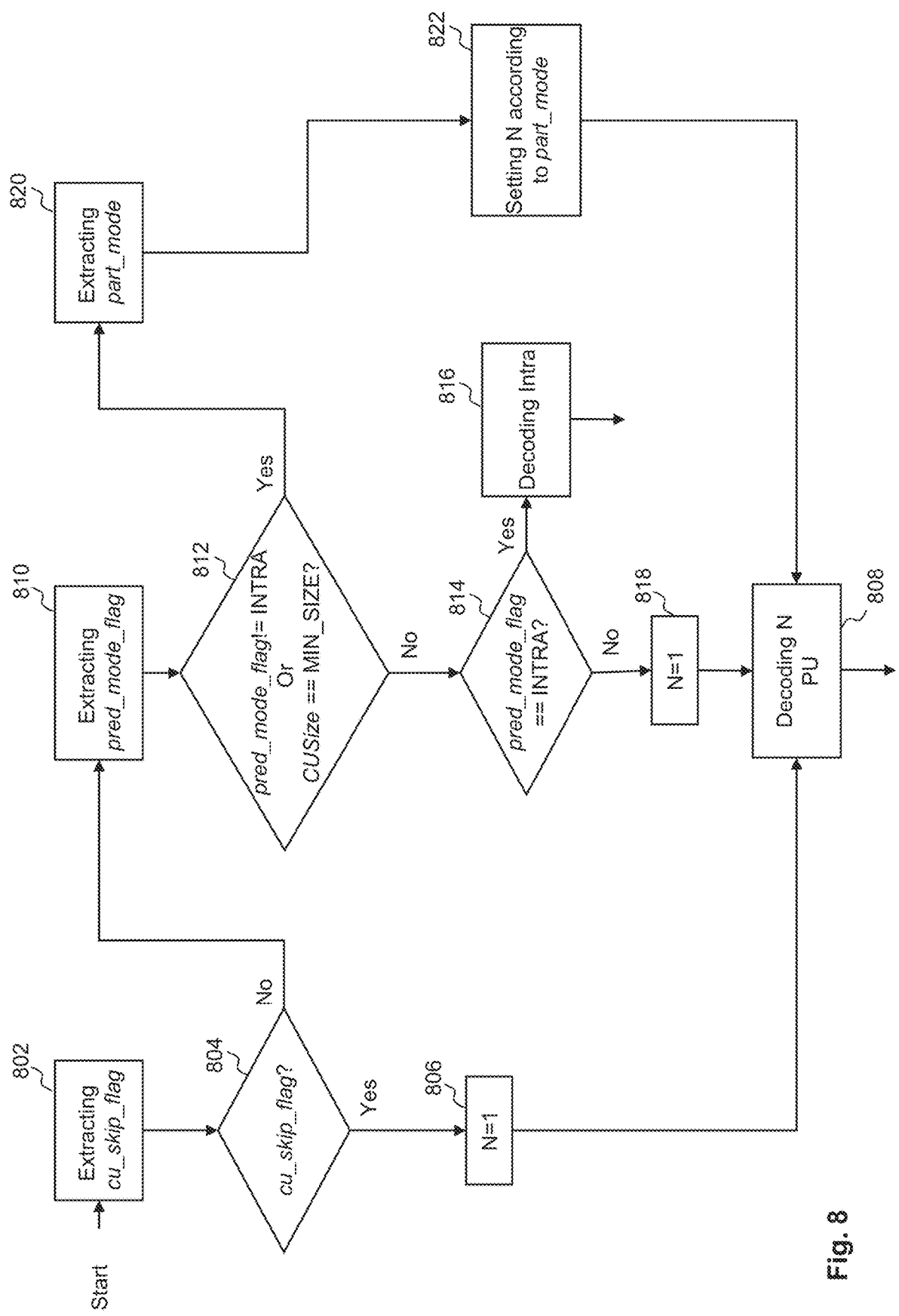
FIG. 8 illustrates an example of steps for decoding syntax elements of a coding unit from a bit-stream.

FIG. 8 illustrates an example of steps for decoding syntax elements of a coding unit from a bit-stream.

For the sake of illustration, it is assumed that the size of the coding units (CUSize) has already been decoded.

As illustrated, a first step (step 802) is directed to the extraction of a coding mode flag known as cu_skip_flag from the bit-stream. Next, a test is performed to determine, according the value of the cu_skip_flag flag, whether or not the coding unit to be processed is to be skipped (step 804). If the coding unit to be processed is to be skipped, the number N of predictor units to decode is set to one (step 806) and a single predictor unit is decoded (step 808).

On the contrary, if the coding unit to be processed is not to be skipped (according the value of the cu_skip_flag flag, as determined at step 804), the coding mode flag known as pred_mode_flag is extracted from the bit-stream (810) and a test is performed to determine whether or not the coding mode is Intra or the size of the coding units ('CUSize') is the minimum possible size of coding units (step 812).

If the pred_mode_flag flag is not equal to Intra or if the size of the coding units is equal to the minimum possible size of coding units, the decoder extracts the coding mode flag known as part_mode (step 820) that determines the partitioning of the coding units (as described by reference to FIG. 1) and consequently the number of prediction units to be decoded. Accordingly, the number N of predictor units to decode is set as a function of the part_mode flag (step 822) and predictor units are decoded (step 808).

On the contrary, if the pred_mode_flag flag is equal to Intra and if the size of the coding units is not equal to the minimum possible size of coding units, a test is performed to determine whether or not the pred_mode_flag flag is equal to Intra (step 814). If the pred_mode_flag flag is equal to Intra, an intra decoding step is carried out (816).

On the contrary, if the pred_mode_flag flag is not equal to Intra (i.e. if the prediction unit is an inter prediction unit), the number N of predictor units to decode is set to one (step 818) and a single predictor unit is decoded (step 808).

Figure 9:
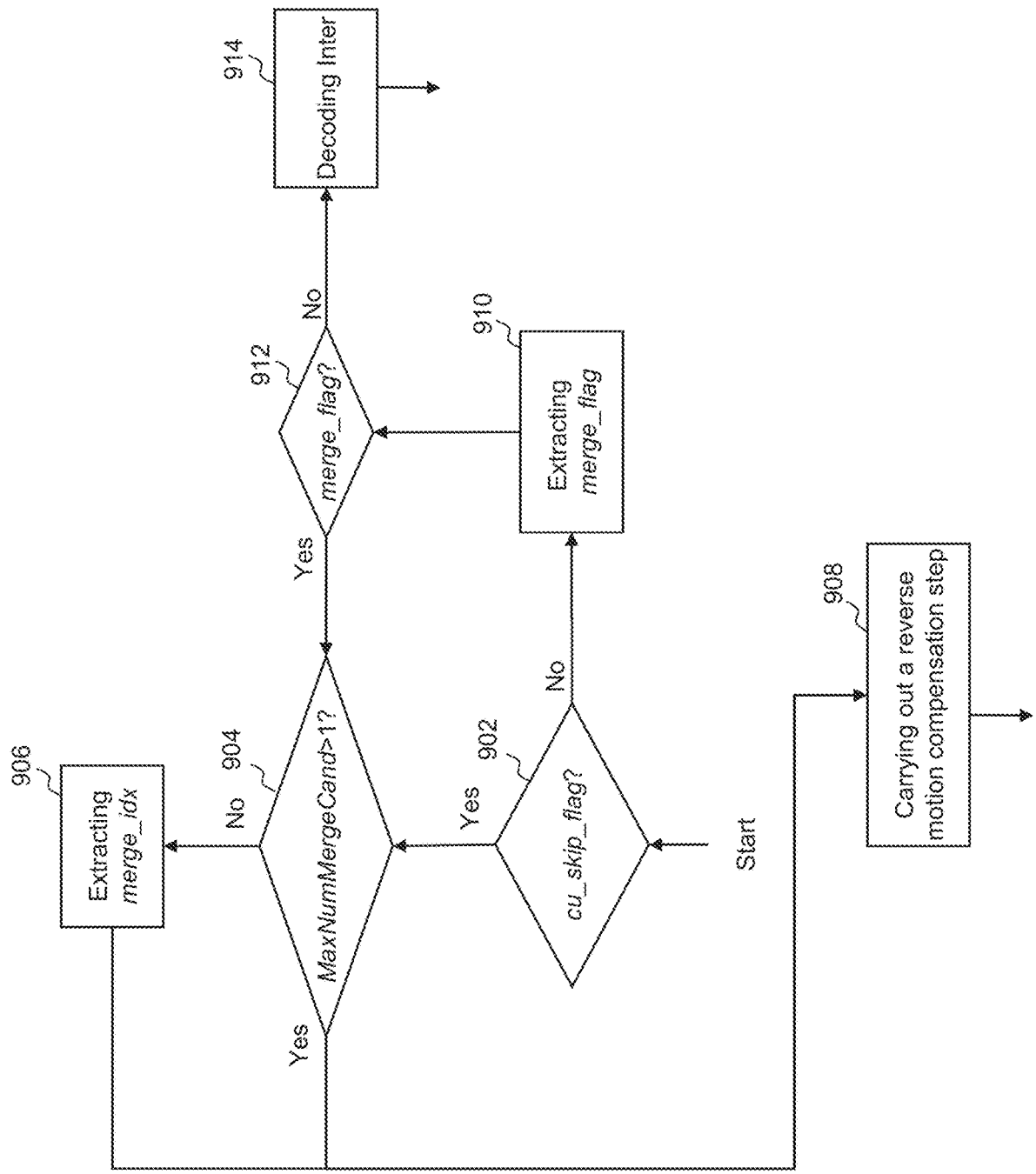
FIG. 9 illustrates an example of steps for decoding syntax elements associated with one prediction unit.

FIG. 9 illustrates an example of steps for decoding syntax elements associated with one prediction unit (as represented with reference 808 in FIG. 8).

As illustrated, a first step (step 902) aims at checking whether or not the prediction unit is to be skipped, as a function of the value of the cu_skip_flag flag. If the prediction unit is skipped, the decoder checks whether or not the maximum number of Merge candidates that are extracted from the bit-stream is greater than one (step 904).

If the maximum number of Merge candidates is not greater than one, the Merge index (merge_idx) is extracted from the bit-stream (step 906) and the decoder carries out a reverse motion compensation step (step 908).

On the contrary, if the maximum number of Merge candidates is greater than one, the decoder directly carries out a reverse motion compensation step (step 908).

If the prediction unit is not to be skipped, the coding mode flag known as merge flag is extracted from the bit-stream (step 910) and a test is performed to determine whether or not the prediction unit is a Merge prediction unit (step 912). If the prediction unit is a Merge prediction unit, a Merge index is decoded if needed (steps 904 and 906), depending on the value of the maximum number of Merge candidates, and next, the reverse motion compensation step is carried out (step 908). On the contrary, if the prediction unit is Inter coded, the related syntax is decoded for decoding the prediction unit (step 914).

Figure 10:
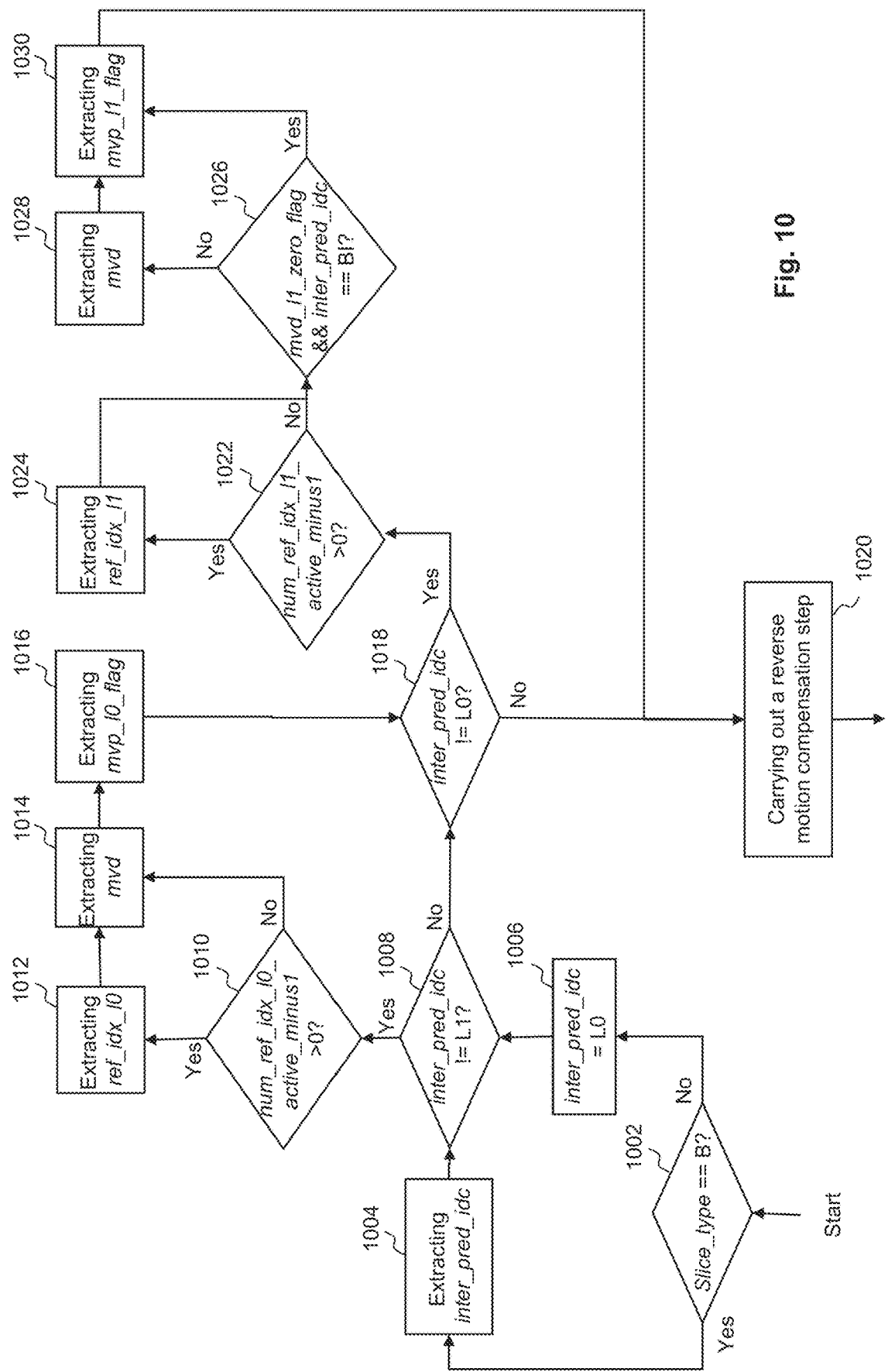
FIG. 10 illustrates an example of steps for decoding syntax elements associated with one Inter prediction unit.

FIG. 10 illustrates an example of steps for decoding syntax elements associated with one Inter prediction unit (as represented with reference 914 in FIG. 9).

A first step is directed to verifying whether or not the type of processed slice is of the bi-prediction type (step 1002). If the type of the processed slice is of the bi-prediction type, an Inter prediction index (denoted inter_pred_idc) is extracted from the bit-stream (step 1004). Such an extracted index is typically equal to list 0 (e.g. L0), list 1 (e.g. L1), or to bi-prediction (e.g. BI).

On the contrary, if the type of the processed slice is not of the bi-prediction type (i.e. it is a uni-prediction slice), the Inter prediction index inter_pred_idc is set to L0 (step 1006).

Next, a test is performed to determine whether or not the value of the Inter prediction index inter_pred_idc is equal to L1 (step 1008). If the value of the Inter prediction index inter_pred_idc is different from L1, the decoder compares the value of the variable known as num_ref_idx_l0_active_minus1, representing the number of reference frames for the list L0 minus 1, to zero (step 1010).

If the value of the variable num_ref_idx_l0_active_minus1 is greater than zero, the reference index for the list L0, denoted ref_idx_l0, and the motion vector residual are extracted from the bit-stream (steps 1012 and 1014). If the value of the variable num_ref_idx_l0_active_minus1 is equal to zero, the motion vector residual is directly extracted from the bit-stream (step 1014).

Next, the flag known as mvp_l0_flag that is associated with the index of the motion vector predictor to be used is extracted from the bit-stream (step 1016).

Similar steps are then carried out to extract motion information associated with the list L1 (steps 1018, 1022, and 1024).

It is noted that regarding the motion information syntax of list L1, and according to the value of the mvd_l1_zero_flag flag extracted from the slice header, the motion vector residual is not always decoded (steps 1026, 1028, and 1030).

When the entirety of the motion information is available (step 1018 or step 1030), the decoder computes the motion predictors and generates the motion information before carrying out the reverse motion compensation (step 1020).

It has been observed that the quarter pel motion accuracy is not efficient for screen content. Therefore, to improve the coding efficiency of HEVC extensions for screen content, several solutions have been developed.

According to a first solution, the motion vector resolution is selected from among the quarter pel and the full pel and signaled at coding unit level.

According to another solution, the motion vector resolution is selected from among the quarter pel resolution, the half pel resolution, and the full pel resolution on a sequence or frame basis (i.e. sequence per sequence or a frame by frame). It is noted here that the determination of the motion vector resolution at low coding structure level is adapted to the mixed content sequence (e.g. a mixed sequence of screen content and natural content).

Therefore, the motion vector resolution is adaptive and changes as a function of the content of the video sequence to be encoded/decoded.

Figure 11:
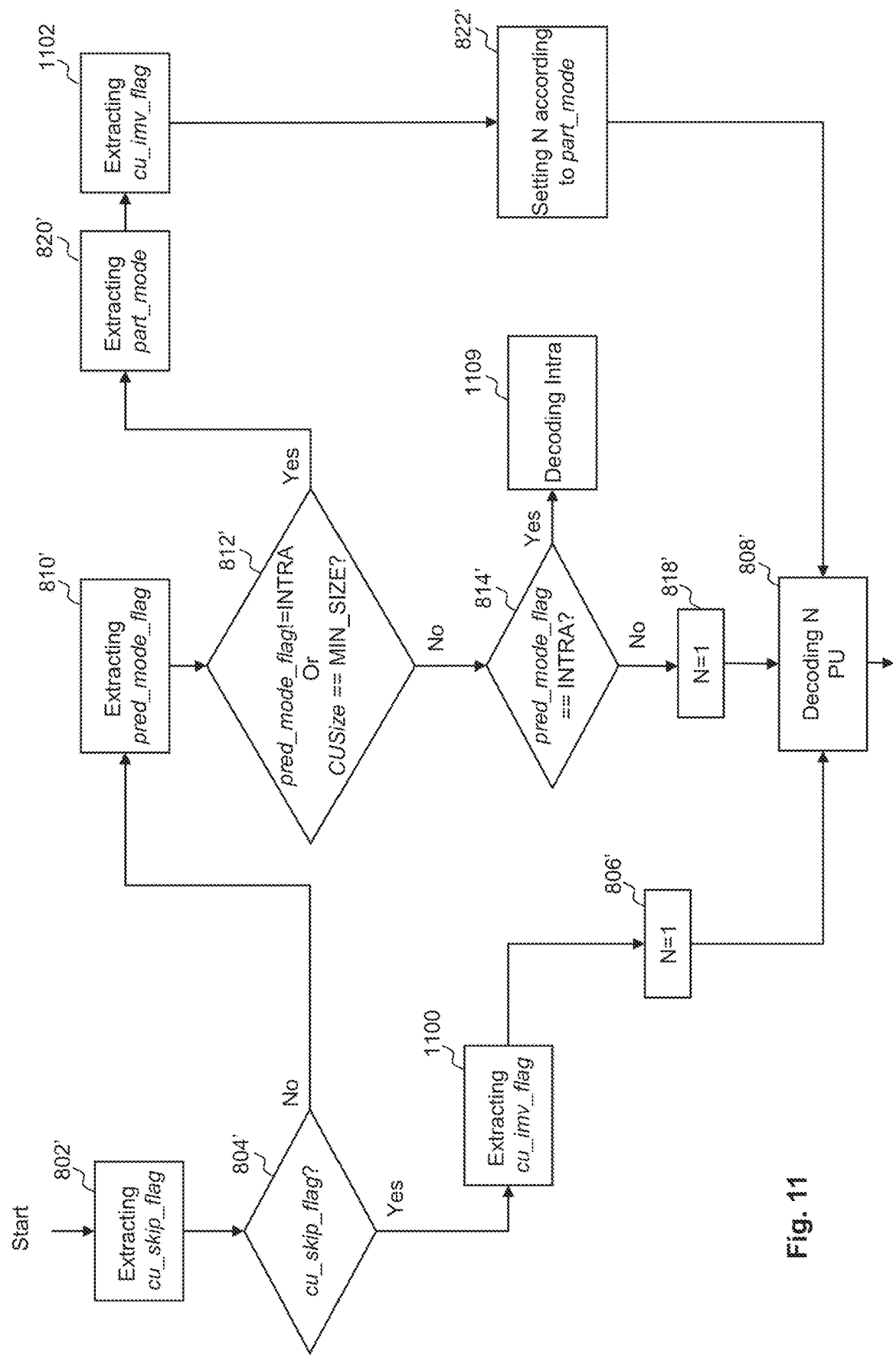
FIG. 11 illustrates an example of steps for decoding syntax elements of a coding unit from a bit-stream when using an adaptive motion vector resolution for the coding units.

FIG. 11 illustrates an example of steps for decoding syntax elements of a coding unit from a bit-stream when using an adaptive motion vector resolution for the coding units.

As illustrated, most of the steps represented in FIG. 11 are similar to steps represented in FIG. 8. In particular, steps 802' to 822' are similar to steps 802 to 822.

A main difference is directed to the use of a coding mode flag denoted cu_imv_flag which specifies that the motion vectors of all the predictor units belonging to the currently processed coding unit are in integer positions (i.e. they correspond to pixel positions and not to sub-pixel positions).

As illustrated, the cu_imv_flag flag is extracted from the bit-stream (step 1100), in the syntax decoding process, when the currently processed coding unit is skipped (according the value of the cu_skip_flag flag, as determined at step 804').

Similarly, if the currently processed coding unit is not skipped and if it is not Intra coded (as determined at steps 804' and 812'), the part_mode and the cu_imv_flag flags are extracted from the bit-stream (steps 820' and 1102, respectively, step 1100 being similar to step 1102).

It is noted that this method has no effect on the syntax decoding process of the belonging predictor units and that it changes the predictor unit decoding process when the cu_imv_flag flag is set to true.

When such a method is applied, each vector of the selected Merge candidate is rounded to the full pel position value, at the decoder end, in the Merge and Merge Skip modes.

At the encoder end, one way of selecting the use of the sub-pel resolution or of the full pel resolution is to test all possible Merge candidates with both resolutions. In that case, for full pel resolution candidates, each candidate is rounded. It is noted that this does not change the Merge mode derivation process since the Merge candidates set is derived by using the sub pel resolution and next, the selected candidate is rounded to the full pel resolution.

Similarly to the handling of Merge prediction units, vector predictors are rounded to the full pel position when processing Inter prediction units in case the cu_imv_flag flag is true (i.e. when the resolution of the prediction units corresponds to the full pel resolution). Accordingly, the AMVP predictors are derived by using the sub pel resolution and then, the selected predictor is rounded to the full pel resolution.

Regarding Inter prediction mode, each component of the motion vector residual is shifted to the full pel resolution at the encoder end so as to reduce the bitrate. At the decoder end, the inverse operation is applied.

Accordingly, each motion vector residual is to be shifted at the encoder end as follows:

$$mv\_res\_x' = mv\_res\_x >> 2$$

$$mv\_res\_y' = mv\_res\_y >> 2$$

where mv_res_x and mv_res_y are the components of the motion vector residual and mv_res_x' and mv_res_y' are the transmitted components of the motion vector residual.

An inverse shifting step is applied to the decoded motion vector residual, at the decoder end, as follows:

$$mv\_res\_x = mv\_res\_x' << 2$$

$$mv\_res\_y = mv\_res\_y' << 2$$

The rounding operations that are carried out to change the motion vectors of a candidate or a motion vector predictor for the AMVP can be the following:

$$rMV += Mv(2,2);$$

$$rMV >>= 2;$$

$$rMV <<= 2;$$

where rMV is a vector (accordingly, each operation is applied to each component). It is to be noted that since the resolution of the vector is always the quarter pel resolution, it is rounded to a full pel position.

Figure 12:
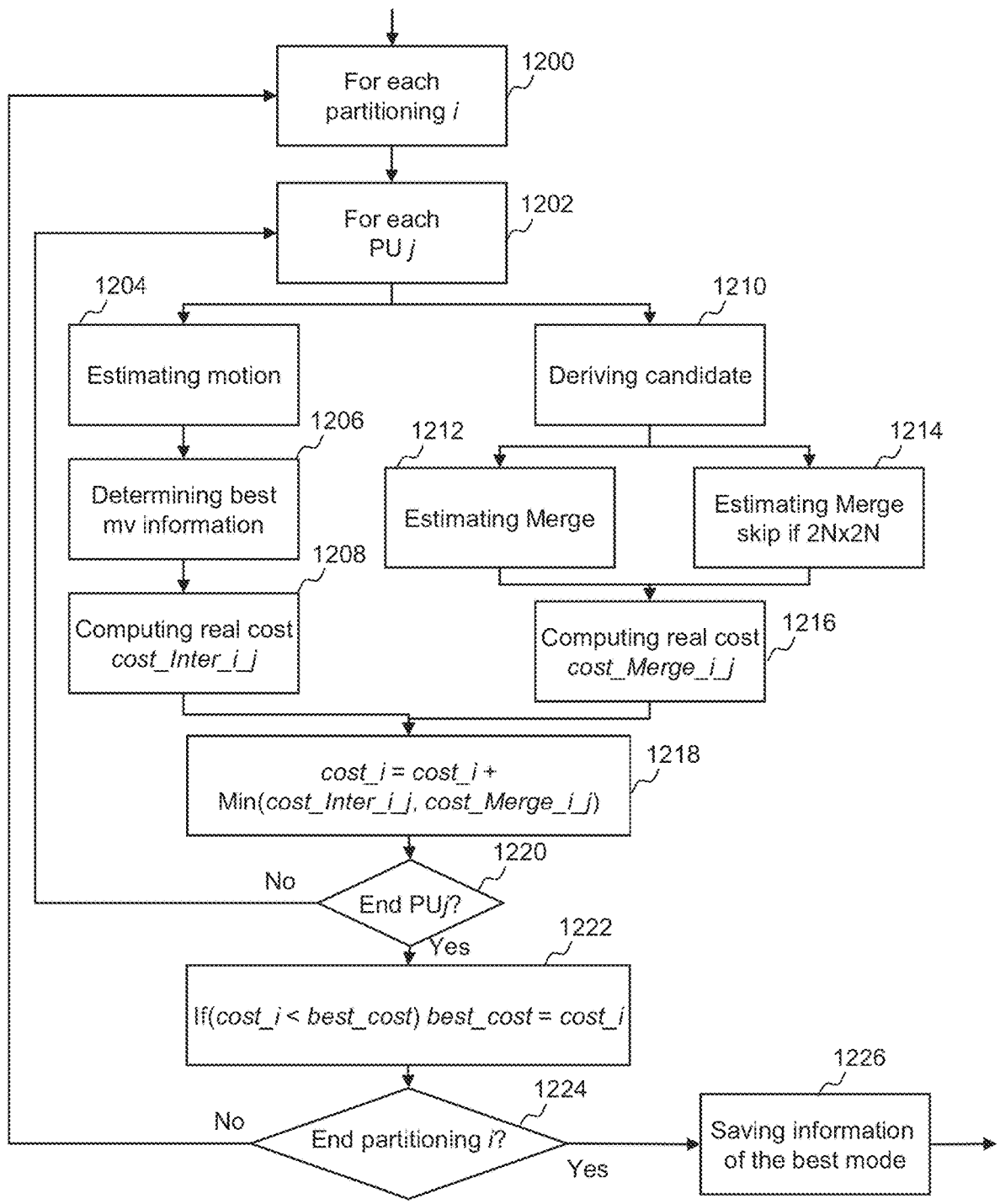
FIGS. 12 and 13 illustrate an example of steps for selecting the best prediction mode among the AMVP and the Merge.
Figure 13:
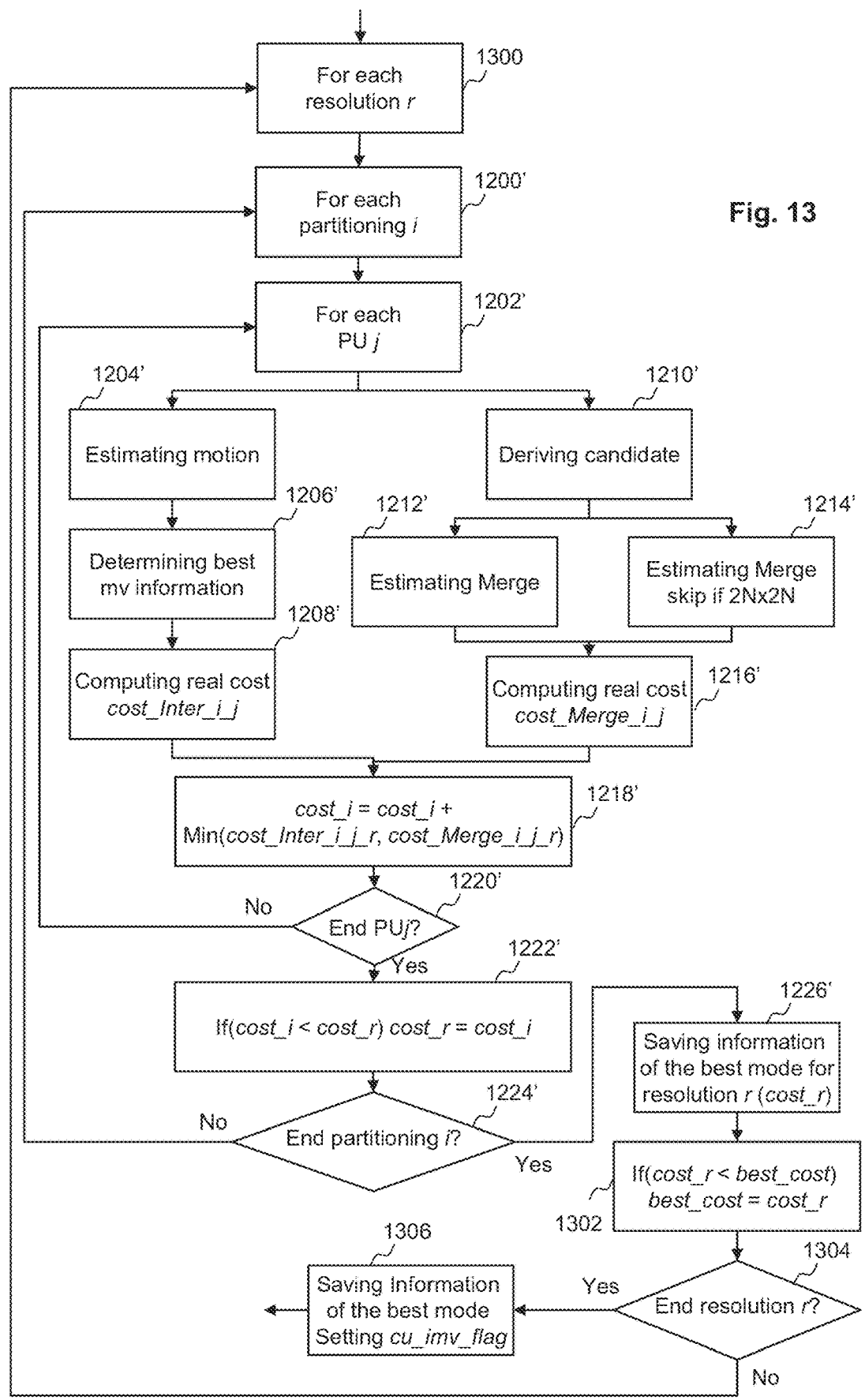

FIGS. 12 and 13 illustrate an example of steps for selecting the best prediction mode from among the Adaptive Motion Vector Prediction and the Merge (classic or skip).

More precisely, FIG. 12 illustrates the selection of an inter coding unit.

As illustrated with steps 1200 and 1202, loops are performed for each possible partitioning denoted i of the coding unit (e.g. 2N×2N, N×2N, and 2N×N) and for each prediction unit denoted j of each partitioning, to estimate the cost of each coding unit.

Motion estimation is carried out for the prediction unit j of the partitioning i, (step 1204) in order to find the best motion information for the current prediction unit (step 1206). Next, the real coding cost cost_Inter_i_j associated with that best motion information is computed (step 1208). To that end, the true rate and the true distortion are computed.

Similarly, the motion candidates are derived for the Merge modes (step 1210) in order to estimate the cost of each candidate for the Merge (step 1212) and for the Merge Skip mode (step 1214) if needed. Next, the real coding cost cost_Merge_i_j is computed (step 1216).

In a following step, the Merge cost and the Inter cost are compared to each other is order to compute the cost of the current partitioning i (step 1218). Next, the encoder processes the next prediction unit (i.e. j=j+1). If the processed prediction unit is the last one of the coding unit (step 1220), a test is performed to determine whether or not the current cost associated with the partitioning i is less than the best cost (initialized to the greatest possible value at the beginning of the algorithm) so as to save the best cost (step 12222) and related data.

Next, the encoder processes the next partition of the coding unit (i.e. i=i+1). If the processed partition is the last one of the coding unit (step 1224), the encoder saves the cost and the related information (typically the motion information and the residual values) associated with the best mode (step 1226).

FIG. 13 illustrates an example of steps for selecting a motion vector resolution. As illustrated, most of the steps represented in FIG. 13 are similar to steps represented in FIG. 12, a main difference being a further loop on motion vector resolution, this further loop being also linked to the coding units. In particular, steps 1200' to 1226' are similar to steps 1200 to 1226.

As illustrated with steps 1300, 1200', and 1202', loops are performed for each possible motion vector resolution (e.g. the quarter pel resolution and the full pel resolution), for each possible partitioning denoted i of the coding unit (e.g. 2N×2N, N×2N, and 2N×N) and for each prediction unit denoted j of each partitioning, to estimate the cost of each coding unit.

Motion estimation is carried out for the prediction unit j of the partitioning i, according to the motion vector resolution r (step 1204') in order to find the best motion information for the current prediction unit (step 1206'). Next, the real coding cost cost_Inter_i_j_r associated with that best motion information is computed (step 1208'). Again, to that end, the true rate and the true distortion are computed.

Similarly, the motion candidates are derived for the Merge modes (step 1210') in order to estimate the cost of each candidate for the Merge (step 1212') and for the Merge Skip mode (step 1214') if needed. Next, the real coding cost cost_Merge_i_j_r is computed (step 1216').

In a following step, the Merge cost and the Inter cost are compared to each other in order to compute the cost of the current partitioning i (step 1218'). Next, the encoder processes the next prediction unit (i.e. j=j+1). If the processed prediction unit is the last one of the coding unit (step 1220'), a test is performed to determine whether or not the current cost associated with the partitioning i is less than the best cost, denoted cost r, for the resolution r (initialized to the greater possible value at the beginning of the algorithm) so as to save the best cost for that resolution (step 12222') and related data.

Next, the encoder processes the next partition of the coding unit (i.e. i=i+1). If the processed partition is the last one of the coding unit (step 1224'), the encoder saves the cost and the related information (typically the motion information and the residual values) associated with the best mode for the resolution r (step 1226').

In a following step, a test is performed to determine whether or not the current cost associated with the resolution r is less than the best cost (initialized to the greatest possible value at the beginning of the algorithm) so as to save the best cost (step 1302) and related data.

Next, the encoder processes the next motion vector resolution of the coding unit. If the processed motion vector resolution is the last one of the coding unit (step 1304), the encoder saves the cost and the related information (typically the motion information and the residual values) associated with the best mode for the resolution r and set the cu_imv_flag flag according to the resolution r providing the best cost (step 1306).

Figure 14:
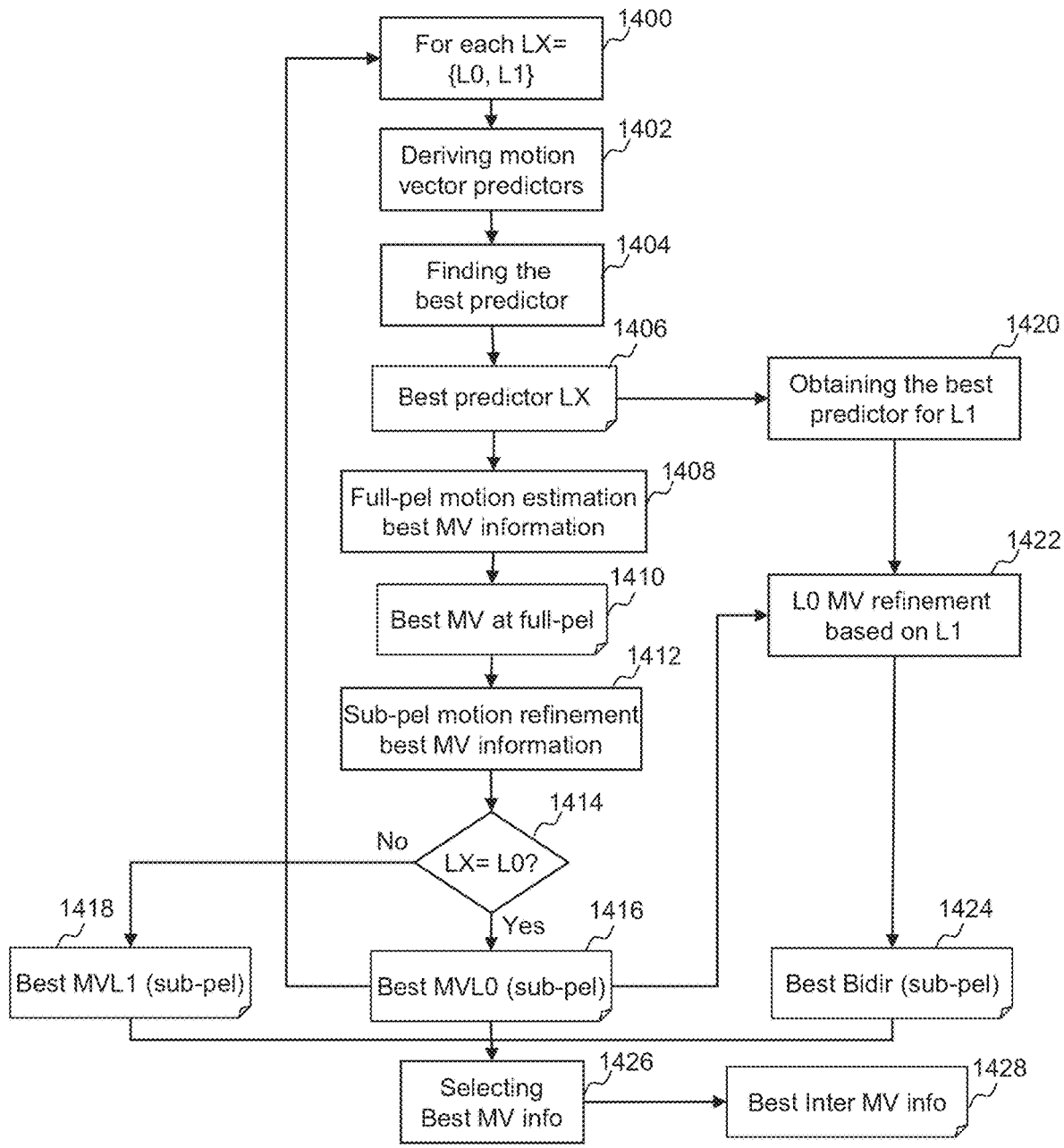
FIG. 14 illustrates an example of selection steps for selecting the best motion information, in a decoder, for an Inter prediction unit, as schematically represented with reference 1204 and 1206 in FIG. 12.

FIG. 14 illustrates an example of selection steps for selecting the best motion information, in a decoder, for an Inter prediction unit, as schematically represented with references 1204 and 1206 in FIG. 12.

As illustrated with reference 1400, the decoder applies the same algorithm for each of the lists L0 and L1, denoted LX (X being equal to 0 or 1).

A first step (step 1402) is directed to the derivation of the motion vector predictors for the associated list and of a reference frame (if needed). Next, the best vector position is determined (step 1404). It is to be recalled that the predictor which gives the best distortion compromise is selected as the best predictor for L0 (X=0) and for L1 (reference 1406).

In a following step, a full pel motion estimation around this best predictor is carried out (step 1408). During this motion estimation, the distortion criteria can be the SAD (Sum of Absolute Difference) and the rate can be estimated as the difference between the current motion vector and the best predictor. It is to be noted that this cost is computed by taking into account the rate of motion information at full pel resolution. This gives the best motion vector (reference 1406) at full pel resolution (reference 1410) which is used for the sub-pel motion estimation refinement (step 1412). In this estimation, the distortion is computed based on the Hadamard transform (HAD) and the rate at sub-pel resolution is estimated as a function of the difference between the current vector and the best predictor (at sub-pel resolution).

Steps 1402 to 1412 are carried out for each reference of the current tested list.

The best determined motion vectors for sub-pel resolution as well as the related costs are stored for L0 and for L1 (step 1414 and references 1416 and 1418, respectively).

Regarding the bidirectional estimation which is to be carried out when the mvd_l1_zero_flag flag is true, the motion vector for L1 is set equal to the best predictor (reference 1406). The best predictor is obtained when the best predictor for L1 is obtained (step 1420), meaning that the best predictor and the best reference frame are determined.

Next, at step 1422, the encoder refines the best motion vector found for L0 (reference 1416) around this value according to the L1 predictor (reference 1406) to obtain the best Bidirectional motion information (step 1424).

In a following step, its rate distortion cost is compared with the rate distortion cost of the best determined motion vectors for sub-pel resolution for L0 and L1 (references 1416 and 1418) in order to obtain the best Inter motion vector information (reference 1428).

Figure 15:
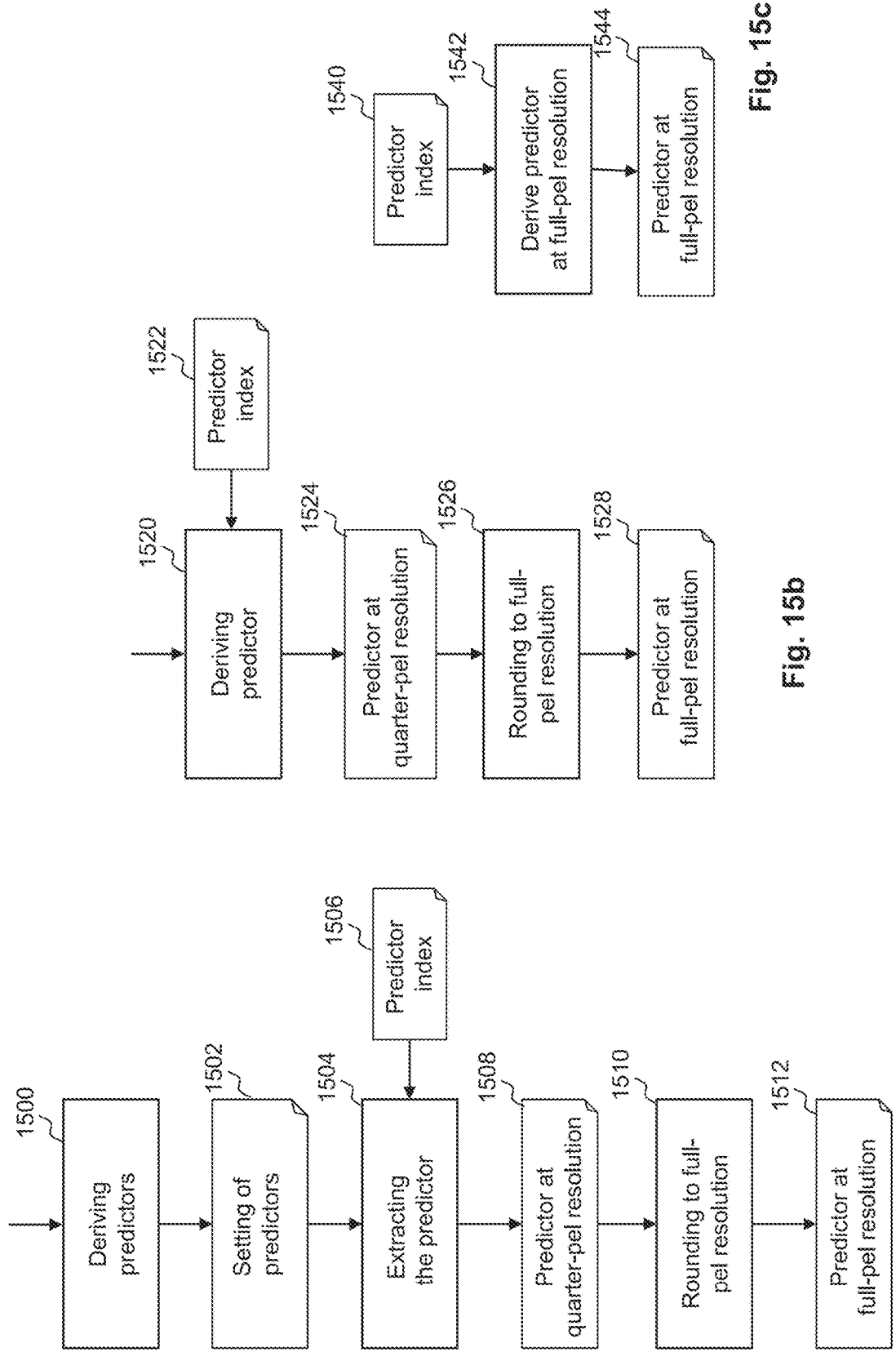
FIGS. 15a, 15b, and 15c, illustrates examples of motion vector derivation processes according to embodiments of the invention.

FIGS. 15*a*, 15*b*, and 15*c*, illustrates examples of motion vector derivation processes according to embodiments of the invention.

According to a first example illustrated in FIG. 15*a*, motion vector predictors (denoted 1502) are generated on a standard basis (step 1500). Next, one vector predictor is extracted from the set of predictors as a function of a received or determined predictor index (step 1506).

The resolution of the extracted predictor is the standard quarter pel resolution (reference 1508). Therefore, if the extracted predictor is to be used in the full pel resolution, the extracted predictor is rounded to the full pel resolution (step 1510) to obtain one predictor at the full pel resolution (reference 1512).

Such a derivation process can be optimized so that the derivation process stops when the predictor associated with a received or a determined predictor index without deriving the full set of predictors. Such an optimized derivation process is illustrated in FIG. 15*b*.

As illustrated, motion vector predictors are successively generated on a standard basis (step 1520) until the motion vector predictor corresponding to a received or a determined predictor index (reference 1522) is obtained (reference 1524).

Again, the resolution of the extracted predictor is the standard quarter pel resolution. Therefore, if the extracted predictor is to be used in the full pel resolution, the extracted predictor is rounded to the full pel resolution (step 1526) to obtain the predictor at the full pel resolution (reference 1528).

According to another solution, the derivation process is modified so as to derive directly a motion vector predictor at the full pel resolution, as illustrated in FIG. 15*c*.

After having received or determined a predictor index (reference 1540), a rounded predictor is directly derived at the full pel resolution (step 1542 and reference 1544). In a particular embodiment, a rounded process is applied in a process of deriving extracted vectors, for example in a process of deriving the vectors 500, 502, 508, 510, 512, 520, and 524 described by reference to FIG. 5 so as to obtain rounded predictors.

It is to be noted that these solutions for deriving predictors apply easily to the derivation of Merge candidates.

Figure 16:
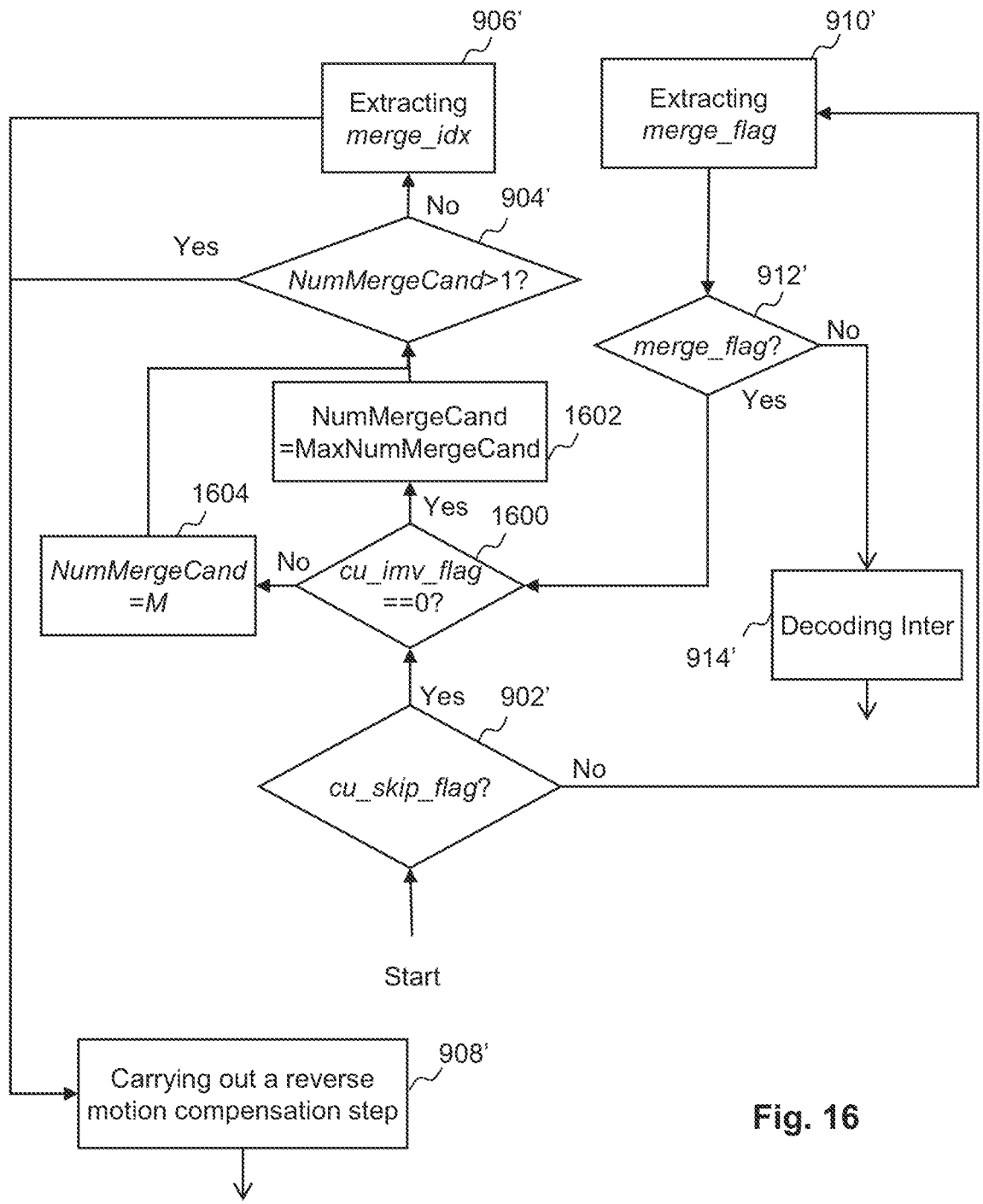
FIG. 16 illustrates an example of steps for decoding syntax elements of a prediction unit from a bit-stream for the Merge mode, according to a particular embodiment, when different pel resolutions can be used.

FIG. 16 illustrates an example of steps for decoding syntax elements of a prediction unit from a bit-stream for the Merge mode, according to a particular embodiment, when different pel resolutions can be used.

As illustrated, most of the steps represented in FIG. 16 are similar to steps represented in FIG. 9. In particular, steps 902' to 914' are similar to steps 902 to 914. However, the size of the set of predictors is determined as a function of the value of the motion vector resolution flag (cu_imv_flag).

As illustrated, a first step (step 902') aims at checking whether or not the prediction unit is skipped, as a function of the value of the cu_skip_flag flag. If the prediction unit is skipped, the decoder checks whether or not the value of the cu_imv_flag flag is equal to zero (step 1600), meaning that the motion vector resolution is the quarter pel resolution.

If the value of the cu_imv_flag flag is equal to zero, the NumMergeCand variable is set to the MaxNumMergeCand (step 1602). On the contrary, if the value of the cu_imv_flag flag is not equal to zero (i.e. the value of the cu_imv_flag flag is equal to one, meaning that the motion vector resolution is the full pel resolution), the NumMergeCand variable is set to a defined value M (step 1604).

Accordingly, if the value of the cu_imv_flag flag is equal to one, the motion vector of the Merge candidates are rounded to the full pel resolution and if it is equal to zero, the motion vector of the Merge candidates are not rounded.

Next, if the maximum number of Merge candidates is not greater than one (step 904'), the Merge index is extracted from the bit-stream (step 906') and the decoder carries out a reverse motion compensation step (step 908'). On the contrary, if the maximum number of Merge candidates is greater than one, the decoder directly carries out a reverse motion compensation step (step 908')

If the prediction unit is not skipped, the merge flag coding mode flag is extracted from the bit-stream (step 910') and a test is performed to determine whether or not the prediction unit is a Merge prediction unit (step 912'). If the prediction unit is a Merge prediction unit, the algorithm is branched to step 1600. On the contrary, if the prediction unit is Inter coded, the related syntax is decoded for decoding the prediction unit (step 914').

In a particular embodiment, the value M is set to one. In another embodiment, the value M is transmitted in the slice header as the MaxNumMergeCand parameter. Still in a particular embodiment, the value M is less than or equal to the MaxNumMergeCand parameter.

Similarly, the size of the set of predictors for Inter prediction units can be determined as a function of the value of the motion vector resolution flag (cu_imv_flag).

Figure 17:
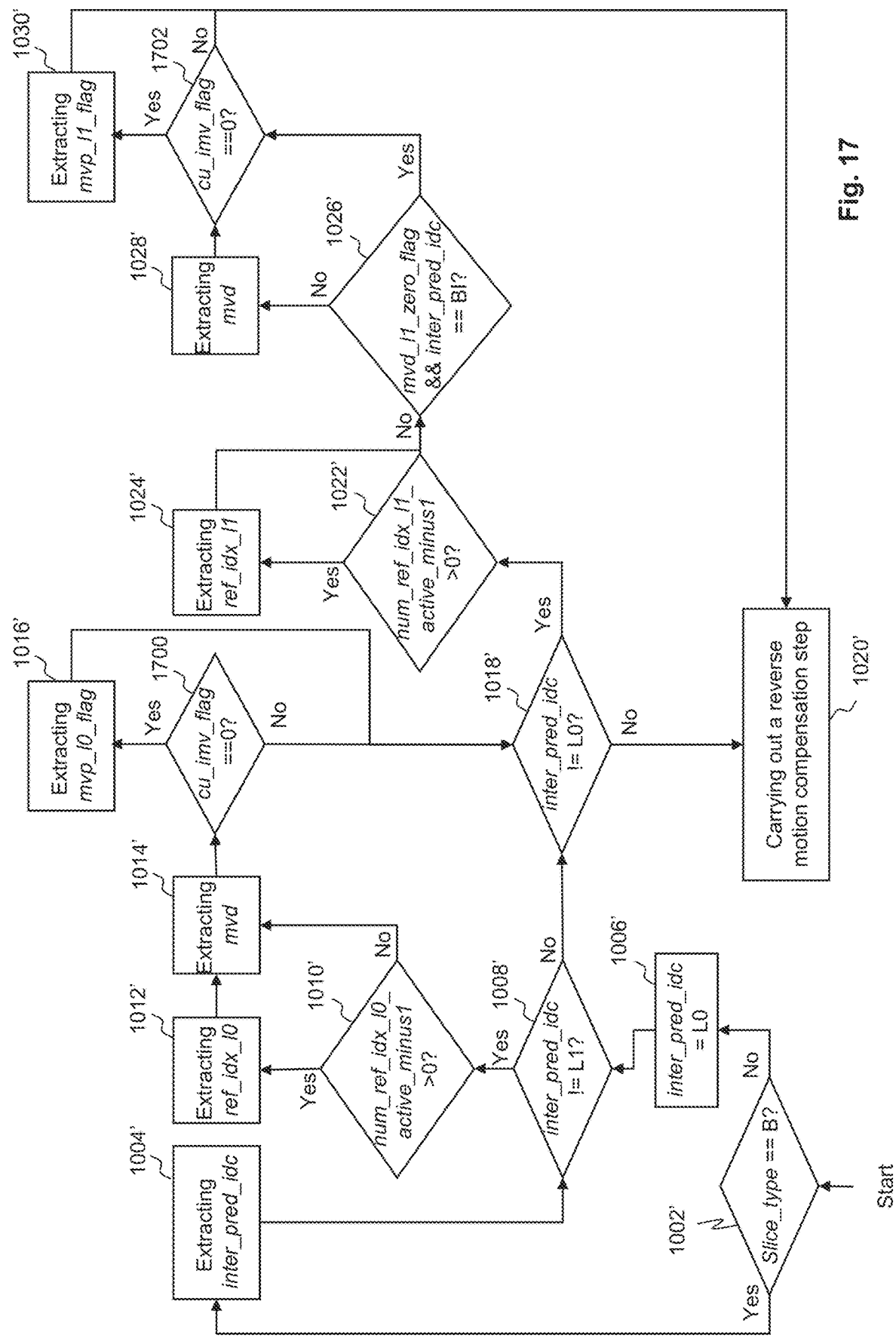
FIG. 17 illustrates an example of steps for decoding syntax elements of a prediction unit from a bit-stream for Inter prediction units, according to a particular embodiment, when different pel resolutions can be used.

FIG. 17 illustrates an example of steps for decoding syntax elements of a prediction unit from a bit-stream for Inter prediction units, according to a particular embodiment, when different pel resolutions can be used.

As illustrated, most of the steps represented in FIG. 17 are similar to steps represented in FIG. 10. In particular, steps 1002' to 1030' are similar to steps 1002 to 1030. However, the size of the set of predictors is determined as a function of the value of the motion vector resolution flag (cu_imv_flag).

A first step is directed to verifying whether or not the type of the processed slice is of the bi-prediction type (step 1002'). If the type of the processed slice is of the bi-prediction type, an Inter prediction index (denoted inter_pred_idc) is extracted from the bit-stream (step 1004'). Such an extracted index is typically equal to list 0 (e.g. L0), list 1 (e.g. L1), or to bi-prediction (e.g. BI).

On the contrary, if the type of the processed slice is not of the bi-prediction type (i.e. it is a uni-prediction slice), the Inter prediction index inter_pred_idc is set to L0 (step 1006').

Next, a test is performed to determine whether or not the value of the Inter prediction index inter_pred_idc is equal to L1 (step 1008'). If the value of the Inter prediction index inter_pred_idc is different from L1, the decoder compares the value of the variable known as num_ref_idx_l0_active_minus1, representing the number of reference frames for the list L0 minus 1, to zero (step 1010'). If the value of the variable num_ref_idx_l0_active_minus1 is greater than zero, the reference index for the list L0, denoted ref_idx_l0, and the motion vector residual are extracted from the bit-stream (steps 1012' and 1014'). If the value of the variable num_ref_idx_l0_active_minus1 is equal to zero, the motion vector residual is directly extracted from the bit-stream (step 1014').

After having extracted the motion vector residual, the decoder checks whether or not the cu_imv_flag flag is equal to zero (step 1700), meaning that the motion vector resolution is the sub-pel resolution. If the cu_imv_flag flag is equal to zero, the mvp_l0_flag flag that is associated with the index of the motion vector predictor to be used is extracted from the bit-stream (step 1016'). Otherwise, it is not needed to extract this predictor flag.

Similar steps are then carried out to extract motion information associated with the list L1 (steps 1018', 1022', and 1024').

Again, it is noted that regarding the motion information syntax of list L1, and according to the value of the mvd_l1_zero_flag flag extracted from the slice header, the motion vector residual is not always decoded (steps 1026', 1028', and 1030').

After having extracted the motion vector residual (step 1028'), the decoder checks whether or not the cu_imv_flag flag is equal to zero (step 1702), meaning that the motion vector resolution is the sub-pel resolution. If the cu_imv_flag flag is equal to zero, the mvp_l1_flag flag that is associated with the index of the motion vector predictor to be used is extracted from the bit-stream (step 1030'). Otherwise, it is not necessary to extract this predictor flag.

When the entirety of the motion information is available (step 1018' or step 1030'), the decoder computes the motion predictors and generates the motion information before processing the reverse motion compensation (step 1020').

It is to be noted that each component of the motion vector residual as determined at steps 1014' and 1028' is shifted if the cu_imv_flag flag is true, as described previously.

Accordingly, in a particular embodiment, the number of predictors for Inter prediction is set to one if the motion vector resolution flag indicates that the full pel resolution is used, the number of predictors being set to two if the motion vector resolution flag is false (i.e. if the motion vector resolution is the quarter pel resolution).

It is noted that only two predictors are used for AMVP in HEVC however, this number may be increased as in the Merge modes. In such a case, according to an embodiment of the invention, the number M of predictors (if the motion vector resolution flag cu_imv_flag is true, i.e. if the full pel resolution is used) is less than or equal to the value N, N being the number of predictors corresponding to the quarter pel resolution (i.e. if the cu_imv_flag flag is false).

According to a particular embodiment, the numbers of predictors M and N are transmitted in the slice header.

Alternatively to the adaptive motion resolution described previously, it is possible to switch between three motion vector resolutions instead of two (e.g. the quarter pel resolution, the half pel resolution, and the full pel resolution).

It is also possible to increase the accuracy of the motion compensation by using, for example, a $⅛^{th}$ pel resolution or a $\frac{1}{16}^{th}$ pel resolution. In such a case, the motion vector resolution flag (cu_imv_flag) is a variable which indicates the sub-pel resolution that can be used.

If it is considered that $N_{1/i}$ is the number of predictors or the number of candidates for the Inter or the Merge mode associated with the 1/i-pel resolution, then, according to a particular embodiment, $$N_{full} \leq N_{1/2} \leq N_{1/4} \leq N_{1/8} \leq N_{1/16}.$$

Each of these numbers can be transmitted in the slice header, independently for Inter or Merge. One variable of the $N_{1/i}$ type can represent one or several sub-resolutions.

According to a particular embodiment, the motion vector resolution can be fixed (no specific flag) and a flag indicates that the number of predictors in the set is reduced.

According to a particular embodiment, the reduction of the set of predictors is determined as a function of a flag independently of the motion vector resolution. Still according to a particular embodiment, the flag which indicates that the set of predictors is reduced is CABAC encoded/decoded and its context depends on the value of the flag of the motion vector resolution.

According to a particular embodiment, a particular flag is extracted from the bit-stream, if the cu_imv_flag flag indicates that the motion resolution is the full pel resolution, to determine whether or not the set of predictors is reduced. As a consequence, if the cu_imv_flag flag indicates that the motion vector resolution is the quarter pel motion vector resolution, no flag indicating that the set of predictors is reduced needs to be extracted from the bit-stream.

If the set of predictors and the motion vector resolution are both reduced, the encoder reduces the number of predictors in the set of predictors when the motion vector resolution is tested as described by reference to FIG. 13. Therefore, if the number of predictors in the set of predictors and the motion vector resolution are jointly encoded, a loop dedicated to the test for a reduced set of predictors is unnecessary. It is to be noted that a reduced set of predictors decreases the encoding time because a smaller number of predictors are tested at the encoder end.

As mentioned above, a number of reference frames (or a reference frame index such as ref_idx_l0 or ref_idx_l1) can be determined as a function of a motion vector resolution flag.

Figure 18B:
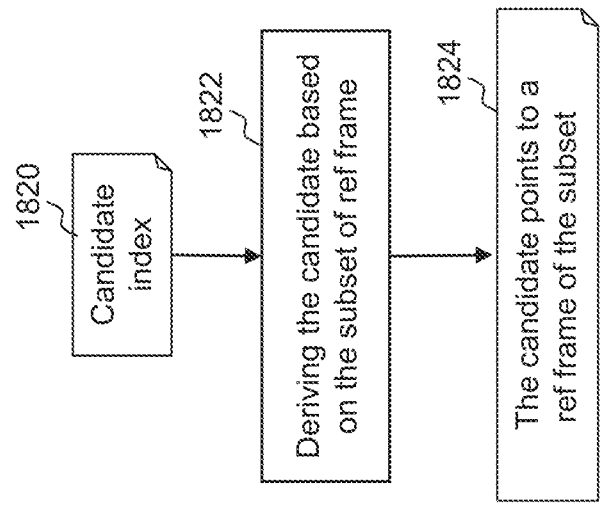
FIGS. 18a and 18b, illustrates examples of candidate derivation processes according to embodiments of the invention.
Figure 18A:
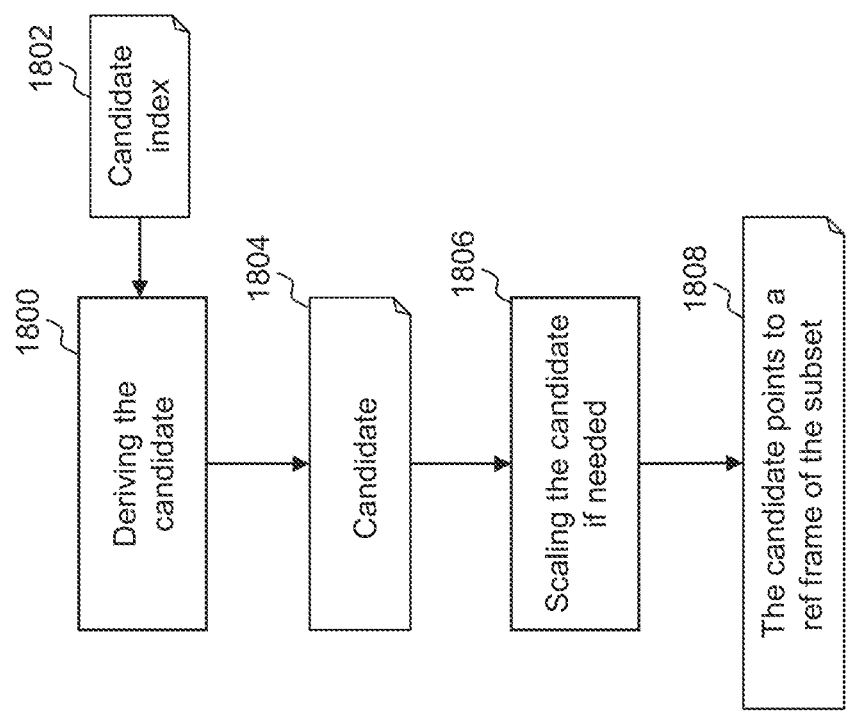

FIGS. 18a and 18b, illustrates examples of candidate derivation processes according to embodiments of the invention.

According to a first example illustrated in FIG. 18a, candidates are successively generated on a standard basis (step 1800) until the candidate corresponding to a received or a determined candidate index (reference 1802) is obtained (reference 1804).

If one or both motion vectors of the obtained candidate does not point to a reference frame of the reduced set, it is scaled (step 1806) so that the obtained and potentially scaled candidate (reference 1808) points to a reference frame of the subset. Such a scaling is a temporal scaling of the motion vector (i.e. the motion vector is scaled by taking into account the temporal distance between a reference frame and another one).

According to another solution, the derivation process is modified so as directly to derive a candidate by taking into account the subset of reference frames, as illustrated in FIG. 18*b*.

After having received or determined a candidate index (reference 1820), a candidate is directly derived based on the subset of reference frames (step 1822 and reference 1824).

It is to be noted that such a solution can be applied only to the Merge derivation process and not to the AMVP process because the AMVP process received the reference frame index to derive motion vector predictors. This particular Merge derivation at full pel resolution means that the process of the Merge derivation described by reference to FIG. 6 is modified. In such a case, checking availability of motion vectors (step 610) takes into account the fact that each of the motion vectors points to one of the restricted sets of reference frames. Another way to perform the motion vector restriction is to apply scaling to the motion vectors (reference 600 to 608) if the corresponding vector does not point to a frame of the reduced set of reference frames.

According to a particular embodiment, the cu_imv_flag flag indicates both that the motion vector resolution is reduced and that the reference frame index is set equal to a default reference frame index.

Figure 19:
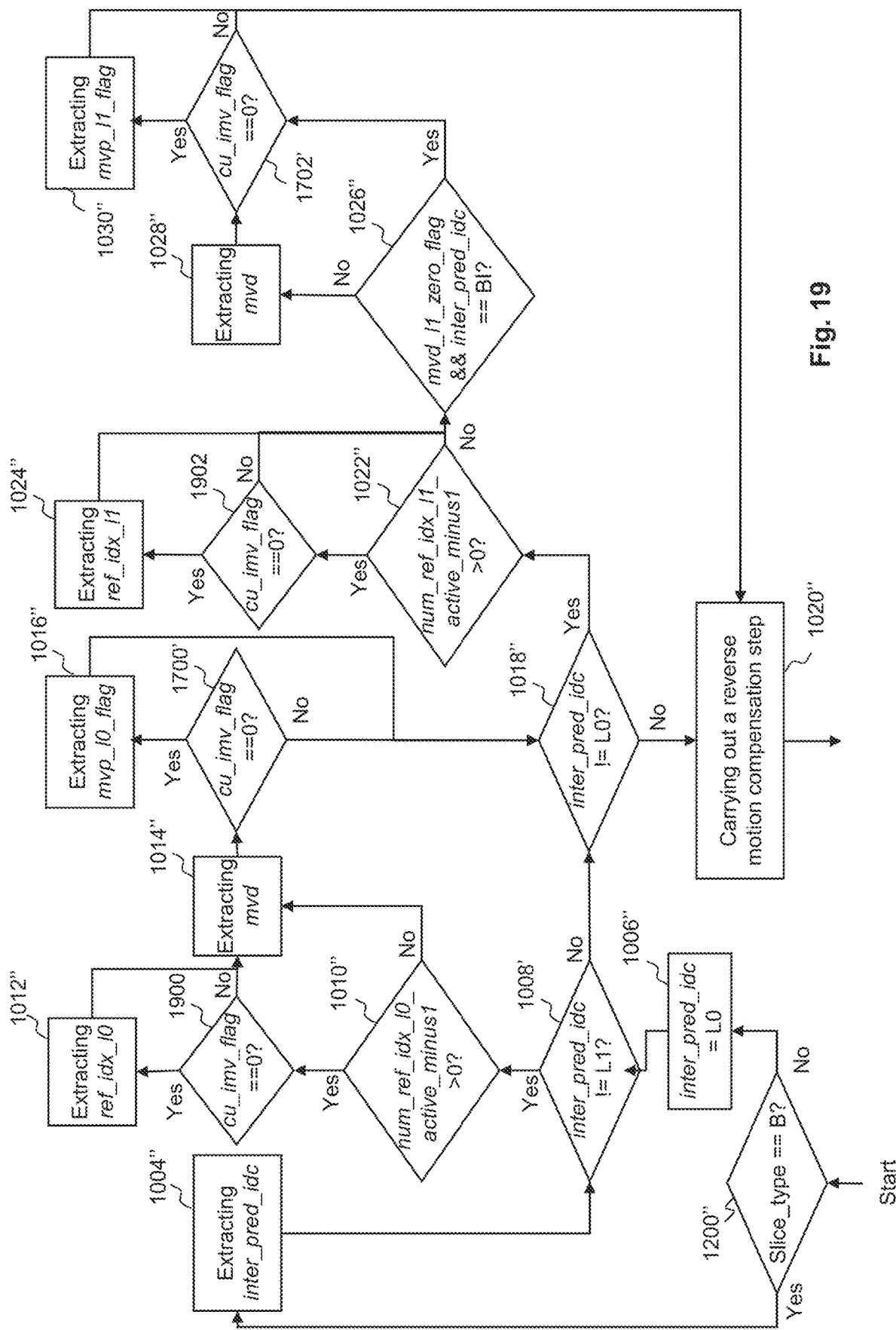
FIG. 19 illustrates an example of steps for decoding syntax elements of a prediction unit from a bit-stream for Inter prediction units, according to a particular embodiment, when different pel resolutions can be used and where a number of reference frames or a reference frame index can be determined as a function of a motion vector resolution flag.

FIG. 19 illustrates an example of steps for decoding syntax elements of a prediction unit from a bit-stream for Inter prediction units, according to a particular embodiment, when different pel resolutions can be used and where a number of reference frames or a reference frame index can be determined as a function of a motion vector resolution flag.

As illustrated, most of the steps represented in FIG. 19 are similar to steps represented in FIGS. 10 and 17. In particular, steps 1002" to 1030" are similar to steps 1002 to 1030 and steps 1700' and 1702' are similar to steps 1700 and 1702.

According to the steps illustrated in FIG. 19, illustrating an embodiment for AMVP, the decoding of the motion vector predictor index flag for L0 and L1 (mvp_l0_flag and mvp_l1_flag) is bypassed if the cu_imv_flag flag is set equal to one (i.e. if the motion vector resolution is the full pel resolution).

A first step is directed to verifying whether or not the type of the processed slice is of the bi-prediction type (step 1002"). If the type of the processed slice is of the bi-prediction type, an Inter prediction index (denoted inter_pred_idc) is extracted from the bit-stream (step 1004"). Such an extracted index is typically equal to list 0 (e.g. L0), list 1 (e.g. L1), or to bi-prediction (e.g. BI).

On the contrary, if the type of the processed slice is not of the bi-prediction type (i.e. it is a uni-prediction slice), the Inter prediction index inter_pred_idc is set to L0 (step 1006").

Next, a test is performed to determine whether or not the value of the Inter prediction index inter_pred_idc is equal to L1 (step 1008"). If the value of the Inter prediction index inter_pred_idc is different from L1, the decoder compares the value of the variable known as num_ref_idx_l0_active_minus1, representing the number of reference frames for the list L0 minus 1, to zero (step 1010").

If the value of the variable num_ref_idx_l0_active_minus1 is greater than zero, a test is performed to determine whether or not the cu_imv_flag flag is equal to zero (step 1900). If the cu_imv_flag flag is equal to zero, the frame reference index for the list L0, denoted ref_idx_l0, is extracted from the bit-stream (steps 1012"). Therefore, the decoder does not decode the frame reference index if the full pel resolution is used.

Next, the motion vector residual is extracted from the bit-stream (step 1014"). If the value of the variable num_ref_idx_l0_active_minus1 is equal to zero, the motion vector residual is directly extracted from the bit-stream (step 1014").

After having extracted the motion vector residual, the decoder checks whether or not the cu_imv_flag flag is equal to zero (step 1700'), meaning that the motion vector resolution is the sub-pel resolution. If the cu_imv_flag flag is equal to zero, the mvp_l0_flag flag that is associated with the index of the motion vector predictor to be used is extracted from the bit-stream (step 1016"). Otherwise, it is not needed to extract this predictor flag.

Similar steps are then carried out to extract motion information associated with the list L1 (steps 1018" and 1022").

If the value of the variable num_ref_idx_l1_active_minus1 is greater than zero, a test is performed to determine whether or not the cu_imv_flag flag is equal to zero (step 1902). If the cu_imv_flag flag is equal to zero, the frame reference index for the list L1, denoted ref_idx_l1, is extracted from the bit-stream (steps 1024"). Therefore, the decoder does not decode the frame reference index if the full pel resolution is used.

Again, it is noted that regarding the motion information syntax of list L1, and according to the value of the mvd_l1_zero_flag flag extracted from the slice header, the motion vector residual is not always decoded (steps 1026", 1028", and 1030").

After having extracted the motion vector residual (step 1028"), the decoder checks whether or not the cu_imv_flag flag is equal to zero (step 1702'), meaning that the motion vector resolution is the sub-pel resolution. If the cu_imv_flag flag is equal to zero, the mvp_l1_flag flag that is associated with the index of the motion vector predictor to be used is extracted from the bit-stream (step 1030"). Otherwise, it is not needed to extract this predictor flag.

When the entirety of the motion information is available (step 1018", step 1702', or step 1030"), the decoder computes the motion predictors and generates the motion information before processing the reverse motion compensation (step 1020").

In this example, the number of reference frame indexes is reduced to one. However, it can be greater.

According to a particular embodiment, the default reference frame index value can be the index of the first reference frame of the list (the minimum reference index).

According to another embodiment, the default reference index can be the index of the reference with the lower QP (Quantization Parameter) value.

Still according to another embodiment, the default reference frame index can be an index transmitted in the slice header if the full pel resolution is used. If the reduced set of reference frames contains more than one reference frame, the previous embodiments can be easily adapted.

If it is considered that $N_{1/i}$ is the number of reference frames associated with the 1/i-pel resolution, then, according to a particular embodiment, $$N_{full} \leq N_{1/2} \leq N_{1/4} \leq N_{1/8} \leq N_{1/16}.$$

Each of these numbers can be transmitted in the slice header, independently for Inter or Merge. One variable of the $N_{1/i}$ type can represent one or several sub-resolutions.

If the reference frame restriction is applied on Merge mode, the motion vectors of each candidate should point to the reference frames of the reduced set of reference frames. Consequently some additional operations are needed.

According to a particular embodiment, the motion resolution can be fixed and a flag indicates that a reduced set of reference frames is used (instead of the classic one).

Still according to particular embodiment, the reduced set of reference frames is determined as a function of a flag, independently of the motion vector resolution.

Still according to particular embodiment, the flag which indicates that the set of reference frames is reduced is CABAC encoded/decoded and its context depends on the value of the flag of the motion vector resolution.

According to a particular embodiment, a particular flag is extracted from the bit-stream, if the cu_imv_flag flag indicates that the motion resolution is the full pel resolution, to determine whether or not the set of reference frames is reduced. As a consequence, if the cu_imv_flag flag indicates that the motion vector resolution is the quarter pel motion vector resolution, no flag indicating that the set of reference frames is reduced needs to be extracted from the bit-stream.

As mentioned above, a prediction mode can be determined as a function of a motion vector resolution flag according to a particular aspect of the invention. Accordingly, according to a particular embodiment, the cu_imv_flag flag is used to indicate both that the motion resolution is reduced and that the bidirectional prediction is not used for a block prediction. For the Inter mode, this offers the possibility to save bits on the inter_pred_idc flag.

Figure 20:
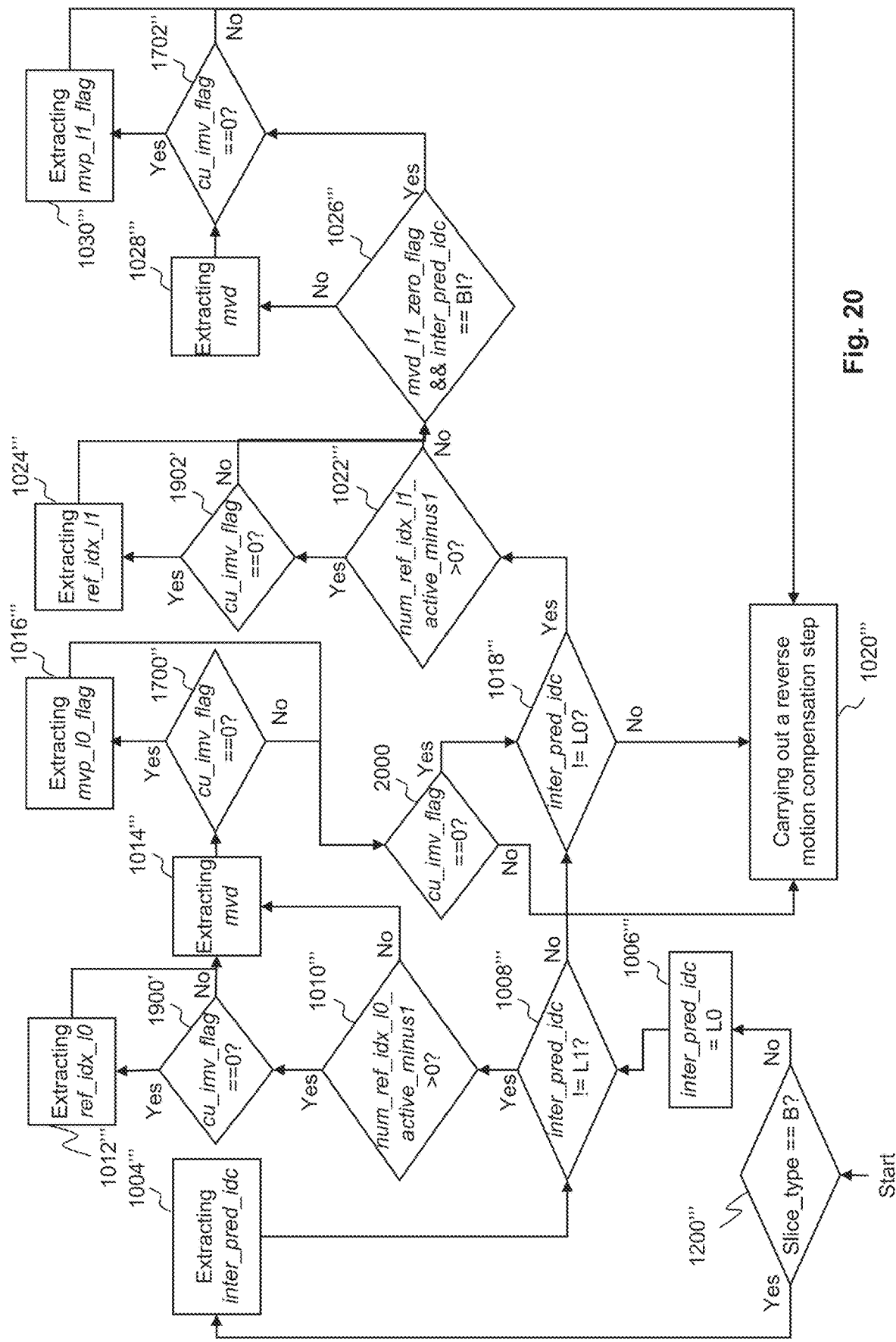
FIG. 20 illustrates an example of steps for decoding syntax elements of a prediction unit from a bit-stream for Inter prediction units, according to a particular embodiment, when different pel resolutions can be used and where the use of the bidirectional prediction is determined as a function of a motion vector resolution flag.

FIG. 20 illustrates an example of steps for decoding syntax elements of a prediction unit from a bit-stream for Inter prediction units, according to a particular embodiment, when different pel resolutions can be used and where the use of the bidirectional prediction is determined as a function of a motion vector resolution flag.

As illustrated, most of the steps represented in FIG. 20 are similar to steps represented in FIGS. 10, 17, and 19. In particular, steps 1002''' to 1030''' are similar to steps 1002 to 1030, steps 1700'' and 1702'' are similar to steps 1700 and 1702, and steps 1900' and 1902' are similar to steps 1900 and 1902.

According to the steps illustrated in FIG. 20, all the features described by reference to FIGS. 17 and 19 are provided by the illustrated process. However, this process can be restricted to the bidirectional prediction determination (i.e. without determination of the number of predictors and/or of reference frames).

A first step is directed to verifying whether or not the type of the processed slice is of the bi-prediction type (step 1002'''). If the type of the processed slice is of the bi-prediction type, an Inter prediction index (denoted inter_pred_idc) is extracted from the bit-stream (step 1004'''). Compared to step 1004'' described by reference to FIG. 19, the extraction of the Inter prediction index is modified in order to by-pass the coding of the bidirectional prediction and to save one bit when it is possible (the bidirectional prediction being determined as a function of the motion vector resolution, it does not need to be signaled).

Therefore, the Inter prediction index inter_pred_idc is a flag which indicates that the list 0 or the list 1 is used.

If the type of the processed slice is not of the bi-prediction type (i.e. it is a uni-prediction slice), the Inter prediction index inter_pred_idc is set to L0 (step 1006''').

Next, a test is performed to determine whether or not the value of the Inter prediction index inter_pred_idc is equal to L1 (step 1008'''). If the value of the Inter prediction index inter_pred_idc is different from L1, the decoder compares the value of the variable known as num_ref_idx_l0_active_minus1, representing the number of reference frames for the list L0 minus 1, to zero (step 1010''').

If the value of the variable num_ref_idx_l0_active_minus1 is greater than zero, a test is performed to determine whether or not the cu_imv_flag flag is equal to zero (step 1900). If the cu_imv_flag flag is equal to zero, the frame reference index for the list L0, denoted ref_idx_l0, is extracted from the bit-stream (steps 1012'''). Therefore, the decoder does not decode the frame reference index if the full pel resolution is used.

Next, the motion vector residual is extracted from the bit-stream (step 1014''). If the value of the variable num_ref_idx_l0_active_minus1 is equal to zero, the motion vector residual is directly extracted from the bit-stream (step 1014''').

After having extracted the motion vector residual, the decoder checks whether or not the cu_imv_flag flag is equal to zero (step 1700''), meaning that the motion vector resolution is the sub-pel resolution. If the cu_imv_flag flag is equal to zero, the mvp_l0_flag flag that is associated with the index of the motion vector predictor to be used is extracted from the bit-stream (step 1016'''). Otherwise, it is not needed to extract this predictor flag.

Next, if the motion information for list L0 has been extracted and if the motion vector resolution flag (cu_imv_flag) indicates that the resolution to be used is the full pel resolution (step 200), it is not needed to decode the motion information for list L1. Accordingly, the decoder computes the motion predictors and generates the motion information before processing the reverse motion compensation (step 1020''').

On the contrary, if the motion vector resolution to be used is not the full pel resolution, steps are carried out to extract motion information associated with the list L1 (steps 1018''' and 1022'').

If the value of the variable num_ref_idx_l1_active_minus1 is greater than zero, a test is performed to determine whether or not the cu_imv_flag flag is equal to zero (step 1902'). If the cu_imv_flag flag is equal to zero, the frame reference index for the list L1, denoted ref_idx_l1, is extracted from the bit-stream (steps 1024''). Again, it is noted that regarding the motion information syntax of list L1, and according to the value of the mvd_l1_zero_flag flag extracted from the slice header, the motion vector residual is not always decoded (steps 1026''', 1028''', and 1030''').

After having extracted the motion vector residual (step 1028'''), the decoder checks whether or not the cu_imv_flag flag is equal to zero (step 1702''), meaning that the motion vector resolution is the sub-pel resolution. If the cu_imv_flag flag is equal to zero, the mvp_l1_flag flag that is associated with the index of the motion vector predictor to be used is extracted from the bit-stream (step 1030'''). Otherwise, it is not needed to extract this predictor flag.

When the entirety of the motion information is available (step 1018''', step 1702'', or step 1030''), the decoder computes the motion predictors and generates the motion information before processing the reverse motion compensation (step 1020''').

It is to be noted that the Inter prediction index (inter_pred_idc) doesn't need to be decoded if the motion vector resolution is the full pel resolution and if the list L0 and the list L1 have exactly the same reference frames in the same order. Indeed, in such a case, the unidirectional prediction is used and there is no difference between the list L0 and the list L1 (except that the motion vector derivation should be different).

For the Merge mode, similarly to the embodiment directed to the reduced set of reference frames, the set of candidates can be modified after the Merge derivation of the candidate in quarter pel resolution. This operation consists in removing the motion vectors of one list (L1 for example) for each candidate. An alternative consists in removing the motion vector of list L0 for the first candidate, the motion vector of list L1 for the second candidate, and so on.

According to another embodiment, the Merge mode derivation process takes into account this modification directly in the derivation of candidates by considering two separate candidates per neighboring positions.

Still according to another embodiment, the cu_imv_flag flag indicates both the reduction of the motion vector resolution and the use of only one list for the motion information. In such a case, the Inter prediction index (inter_pred_idc), as extracted at step 1004'', does not need to be extracted from the bit-stream. The Inter prediction index can be set to L0 by default or the default value can be transmitted in the slice header. In such a case, only L0 or L1 motion information needs to be extracted. As a consequence, the step 2000 in FIG. 20 is not needed and the input arrows are directly connected to step 1020''.

According to a particular embodiment, the motion vector resolution can be fixed and a flag can be used to indicate that only one list is used for the motion vector.

Still according to a particular embodiment, the bidirectional limitation or the use of only one list is determined as a function of a flag, independently of the motion vector resolution. Still according to a particular embodiment, the flag which indicates a bidirectional limitation or the use of only one list is encoded with CABAC. Its context depends on the value of the flag of the motion vector resolution.

According to a particular embodiment, a particular flag is extracted from the bit-stream, if the cu_imv_flag flag indicates that the motion resolution is the full pel resolution, to determine whether or not the bidirectional mode (or a list limitation) is to be used. As a consequence, if the cu_imv_flag flag indicates that the motion vector resolution is the quarter pel motion vector resolution, no flag indicating that the bidirectional mode (or a list limitation) is to be used needs to be extracted from the bit-stream.

In one embodiment of the invention, the motion vector resolution, the reduced number of predictors, the reduced set of reference frames and the bidirectional or list restriction are combined. FIG. 16 illustrates this full combination. All possible pairs or triplets of these 4 restrictions can be envisaged. For all possible combinations, independent flags can be considered with or without a dependency between these flags.

The combination of different motion vector information restrictions as described above needs adaptation to the signaling of a combined flag or the use of several flags. In one embodiment, when several restrictions are used (e.g. the motion vector resolution, the number of predictors, the number of reference frames, a list or the bidirectional mode) the flag can be signaled at a lower level. For example, the cu_imv_flag flag can be signaled at the prediction unit level (in such a case, it should be called pu_imv_flag).

According to a particular embodiment, these restrictions can be signaled at different levels when several flags are used to signal restrictions. For the sake of illustration, the motion vector resolution can be signaled at the coding tree block level or at the slice level and the restriction directed to the number of predictors can be signaled at the prediction unit level.

According to a particular embodiment, the restriction regarding the use of the bidirectional mode or indicating a list is signaled at the coding tree block level.

Still according to a particular embodiment, the use of one or several restrictions at low level is signaled at the slice level.

It is recalled that the adaptive motion vector resolution is commonly used for both Inter and Merge modes. However, according to a particular embodiment, the adaptive motion vector resolution is used only for the Inter mode and it is signaled at the prediction unit level.

A first advantage provided by such a choice is directed to the reduction of the complexity for the derivation of the Merge candidate since it avoids rounding operations on vectors.

Another advantage is directed to the coding efficiency improvement. The use of the adaptive motion vector resolution flag is efficient in particular because it reduces the motion vector residual rate when the vector is coded with the full pel resolution. It is observed that the use of the adaptive motion vector resolution for Merge mode has small impact on the coding efficiency because it doesn't change the rate.

It is to be noted that the Inter mode is signaled for prediction units and thus, it is preferable to signal the motion vector resolution at the same level (if the flag is signaled at the coding unit level, it is sometimes signaled even if the prediction unit is not an Inter prediction unit).

According to another embodiment, the motion vector predictors of L1 are not rounded when the bidirectional prediction is used for an Inter prediction unit and when the mvd_l1_zero_flag flag is enabled. Indeed, when these conditions are true, no motion vector residual is transmitted as described by reference to FIG. 10 (steps 1026 and 1028). As in the Merge modes which do not use a motion vector residual, the predictor of list 1, when the motion vector residual is not coded, does not need to be rounded. This reduces the complexity of the AMVP derivation process.

According to another embodiment, when the adaptive motion vector resolution is used, only the residual is scaled at the decoder end and the motion vector predictors are not rounded.

According to a particular embodiment, the adaptive motion vector resolution at the prediction unit level is combined, only for Inter mode, with the reduction of the set of motion vector predictors. For this specific case, the pu_imv_flag flag indicates that the motion vector resolution is set to the full pel resolution and that only one predictor is used for AMVP. Accordingly, no vector predictor is to be transmitted. This offers a complexity reduction and an improvement of the coding efficiency.

According to another embodiment, the reduction of the set of motion vector predictors is applied without the adaptive motion vector resolution at the prediction unit level for the Inter mode only. It means that a flag is transmitted to indicate that only one predictor is used for the current Inter predictor.

Still according to a specific embodiment, the flag pu_pred_flag flag can have a particular meaning in order to improve the coding efficiency. In a first condition, if the current prediction unit is uni-predicted and if this flag is false, it is not needed to extract the related mvp_l0_flag or mvp_l1_flag flag (since pu_pred_flag flag is false, the second predictor is used). Otherwise, the encoder sets the pu_pred_flag flag to one in order to indicate that the first predictor is selected for the current prediction unit. In a second condition, if the current prediction unit is bi-predicted and if the pu_pred_flag flag is false, if the first predictor mvp_l0_flag flag is equal to the first predictor, it is not needed to extract the second predictor mvp_l1_flag since it is equal to the second predictor. Otherwise, the encoder sets the pu_pred_flag flag to one in order to use the first predictor for both directions.

An alternative to the first condition is to use this pu_pred_flag flag only when the Inter prediction unit is bidirectional.

According to a particular embodiment, only the motion estimation is computed twice (and not the residual coding) in order to limit the additional complexity needed for handling the full pel resolution in addition to the sub pel resolution. This means that two motion estimations are done for each prediction unit: one for the sub-pel resolution and one for the full-pel resolution.

Figure 21:
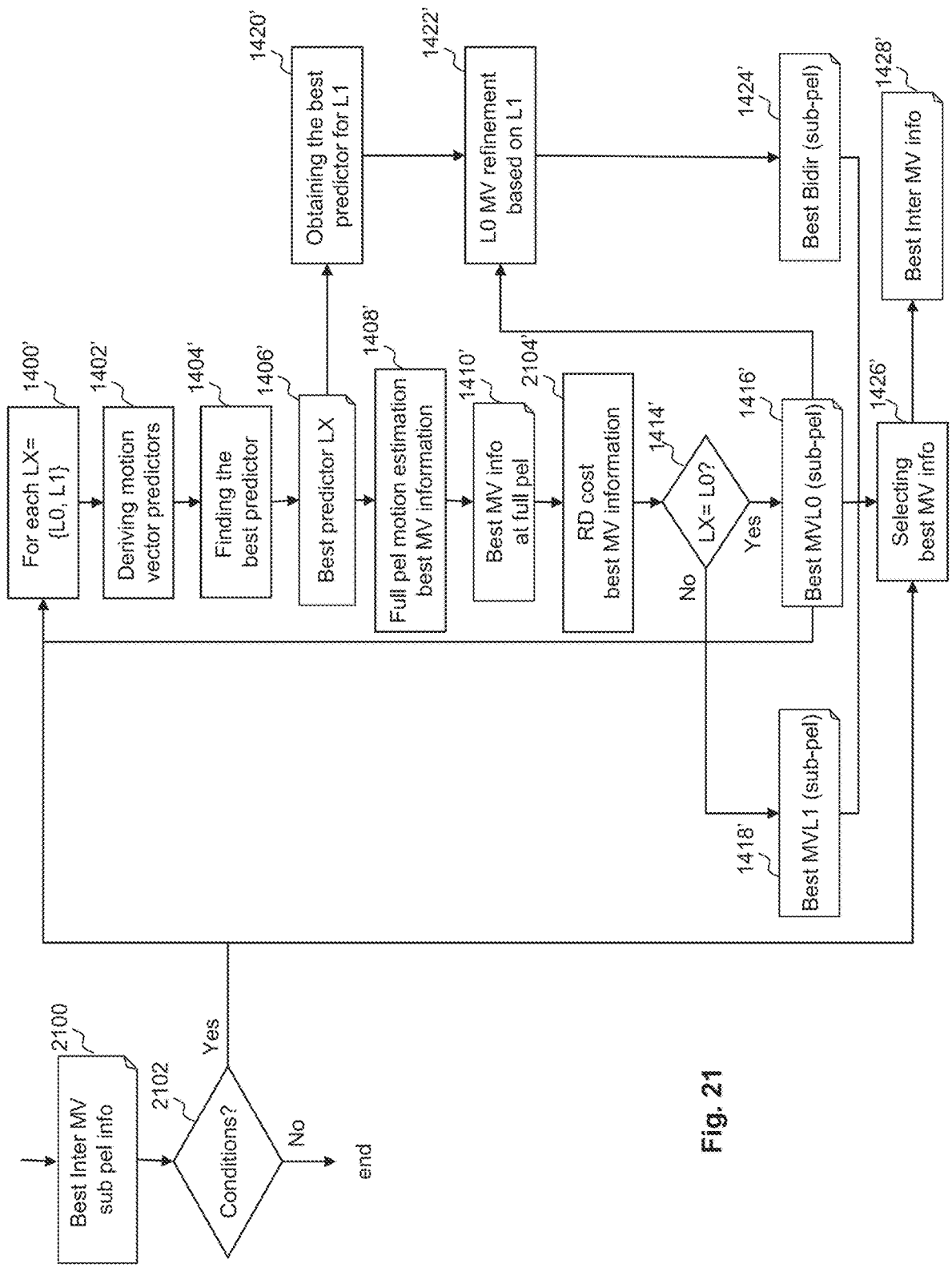
FIG. 21 illustrates an example of steps of an encoding process for the adaptive motion vector for Inter prediction units.

FIG. 21 illustrates an example of steps of an encoding process for the adaptive motion vector for Inter prediction units.

Most of the steps represented in FIG. 21 are similar to steps represented in FIG. 14. In particular, steps 1400' to 1428' are similar to steps 1400 to 1428.

As illustrated, the best Inter motion information obtained for the sub-pel motion vector resolution (reference 2100) is taken into account to determine whether or not the motion estimation for the full pel resolution needs to be carried out (step 2102).

The conditions taken into account at step 2102 can be based on the value of the motion vector. According to a particular embodiment, the full pel estimation is applied only if one motion vector component exceeds a predetermined threshold value. Still in a particular embodiment, this threshold value is set equal to one which means that the sub pel estimation is not carried out if the motion vector found is equal to (0,0).

If the full pel resolution does not need to be carried out, the process ends. On the contrary, if the full pel resolution needs to be carried out, the decoder applies the same algorithm for each of the L0 and L1 lists, denoted LX (X being equal to 0 or 1), as illustrated with reference 1400'.

A first step (step 1402') is directed to the derivation of the motion vector predictors for the associated list and of a reference frame (if needed). Next, the best vector position is determined (step 1404'). It is recalled that the predictor which gives the best distortion compromise is selected as the best predictor for L0 (X=0) and for L1 (reference 1406').

It is to be noted that if the adaptive motion vector resolution for the Inter prediction unit is combined with the use of only one predictor, execution of steps 2102' and 2104' is not needed because only one predictor is used.

Next, a full pel motion estimation around this best predictor is carried out (step 1408'). During this motion estimation, the distortion criterion can be the SAD (Sum of Absolute Difference) and the rate can be estimated as the difference between the current motion vector and the best predictor. It is to be noted that this cost is computed by taking into account the rate of motion information at full pel resolution. This gives the best motion vector (reference 1406') at full pel resolution (reference 1410').

Instead of carrying out a sub pel motion estimation refinement step as described by reference to FIG. 14 (step 1412), the rate distortion cost is computed with the Hadamard transform as for the sub pel estimation (step 2104) in order to compare the best rate distortion cost found for L1, L0, and Bidir (step 1426').

Steps 1402' to 1410' and 2104 are carried out for each reference of the current tested list.

The best rate distortion cost and the associated motion vector information are stored for L0 and for L1 (step 1414' and references 1416' and 1418', respectively).

Regarding the bidirectional estimation which is to be carried out when the mvd_l1_zero_flag flag is true, the motion vector for L1 is set equal to the best predictor (reference 1406'). The best predictor is obtained when the best predictor for L1 is obtained (step 1420').

Next, at step 1422', the encoder refines the best motion vector found for L0 (reference 1416') around this value according to the L1 predictor (reference 1406') to obtain the best Bidirectional motion information (step 1424').

In a following step, its rate distortion cost is compared with the rate distortion cost of the best determined motion vectors for sub pel resolution for L0 and L1 (references 1416' and 1418') in order to obtain the best Inter motion vector information (reference 1428').

It is to be noted that the sub pel motion estimation (step 1422') is not needed, for the Bidirectional estimation, for the refinement of L0 motion information (reference 1416') based on the best predictor of L1 (step 1420').

The three rate distortion costs obtained for L0, L1 and Bidirectional, for the full pel resolution, are compared to the best Inter motion information for the sub pel resolution (reference 2100) to determine whether the pu_imv_flag flag is to be set to one or to zero (step 1426').

According to a particular embodiment, only LX is tested for the full pel estimation if the motion information selected of the sub pel resolution uses LX.

According to a particular embodiment, only the BI prediction is tested for the full pel estimation if the motion information selected of the sub pel resolution uses the BI prediction.

According to a particular embodiment, only the reference frame number n is tested for the full pel estimation if the motion information selected of the sub pel resolution uses this reference frame number n.

It is to be noted that adapting the motion vector resolution can be carried out with some restrictions.

According to a particular embodiment, adapting the motion vector resolution is carried out at the prediction unit level, only for the Inter prediction mode.

Still according to a particular embodiment, adapting the motion vector resolution is carried out at the prediction unit level, only for the Inter prediction mode, without rounding the motion vector predictors.

Still according to a particular embodiment, adapting the motion vector resolution is carried out at the prediction unit level, only for the Inter prediction mode, without rounding the motion vector predictors when no residual motion vector values are transmitted.

Still according to a particular embodiment, adapting the motion vector resolution is carried out at the prediction unit level, only for the Inter prediction mode, without rounding the motion vector predictors when the residual motion vector values is equal to zero.

Still according to a particular embodiment, adapting the motion vector resolution is carried out at the prediction unit level, only for the Inter prediction mode, and the number of predictors decreases when the motion vector resolution decreases.

Still according to a particular embodiment, adapting the motion vector resolution is carried out at the prediction unit level, only for the Inter prediction mode, and the number of predictors, the number of frame reference indexes, and/or a prediction mode are determined as a function of the motion vector resolution.

Still according to a particular embodiment, adapting the motion vector resolution is carried out at the prediction unit level, only for the Inter prediction mode, and the motion vector resolution, the number of predictors, and/or the number of frame reference indexes are determined as a function of a prediction mode.

Figure 22:
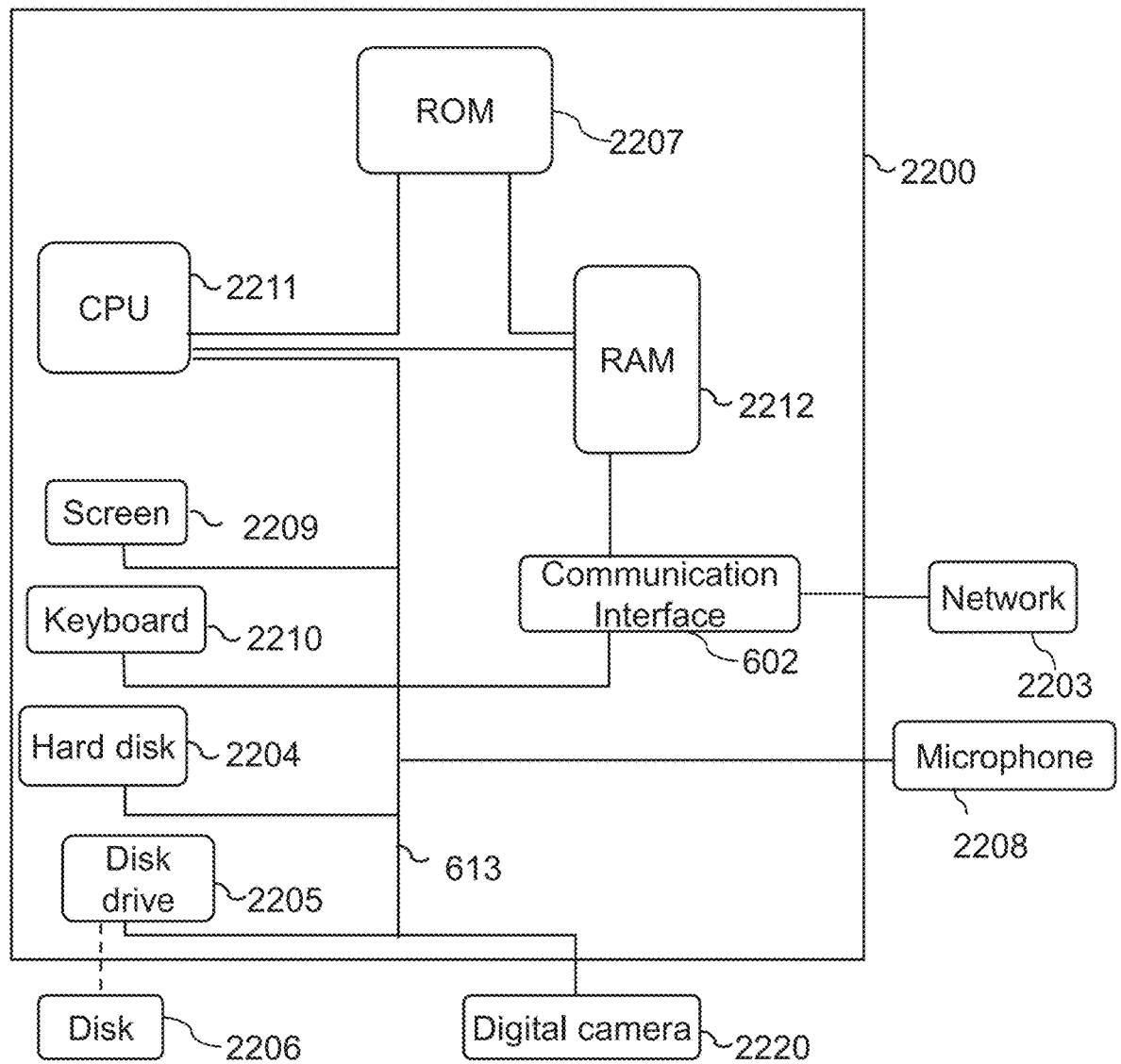
FIG. 22 is a block diagram illustrating components of a processing device in which embodiments of the invention may be implemented.

FIG. 22 schematically illustrates a processing device 2200 configured to implement at least one embodiment of the present invention. The processing device 2200 may be a device such as a micro-computer, a workstation or a light portable device. The device 2200 comprises a communication bus 2213 to which there are preferably connected:

- a central processing unit 2211, such as a microprocessor, denoted CPU;
- a read only memory 2207, denoted ROM, for storing computer programs for implementing the invention;
- a random access memory 2212, denoted RAM, for storing the executable code of the method of embodiments of the invention as well as the registers adapted to record variables and parameters necessary for implementing the method of encoding a sequence of digital images and/or the method of decoding a bit-stream according to embodiments of the invention; and
- a communication interface 2202 connected to a communication network 2203 over which digital data to be processed are transmitted.

Optionally, the apparatus 2200 may also include the following components:

- a data storage means 2204 such as a hard disk, for storing computer programs for implementing methods of one or more embodiments of the invention and data used or produced during the implementation of one or more embodiments of the invention;
- a disk drive 2205 for a disk 2206, the disk drive being adapted to read data from the disk 2206 or to write data onto said disk;
- a screen 2209 for displaying data and/or serving as a graphical interface with the user, by means of a keyboard 2210 or any other pointing means.

The apparatus 2200 can be connected to various peripherals, such as for example a digital camera 2200 or a microphone 2208, each being connected to an input/output card (not shown) so as to supply multimedia data to the apparatus 2200.

The communication bus provides communication and interoperability between the various elements included in the apparatus 2200 or connected to it. The representation of the bus is not limiting and in particular the central processing unit is operable to communicate instructions to any element of the apparatus 2200 directly or by means of another element of the apparatus 2200.

The disk 2206 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bit-stream according to the invention to be implemented.

The executable code may be stored either in read only memory 2207, on the hard disk 2204 or on a removable digital medium such as for example a disk 2206 as described previously. According to a variant, the executable code of the programs can be received by means of the communication network 2203, via the interface 2202, in order to be stored in one of the storage means of the apparatus 2200 before being executed, such as the hard disk 2204.

The central processing unit 2211 is adapted to control and direct the execution of the instructions or portions of software code of the program or programs according to the invention, instructions that are stored in one of the aforementioned storage means. On powering up, the program or programs that are stored in a non-volatile memory, for example on the hard disk 2204 or in the read only memory 2207, are transferred into the random access memory 2212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Naturally, in order to satisfy local and specific requirements, a person skilled in the art may apply to the solution described above many modifications and alterations all of which, however, are included within the scope of protection of the invention as defined by the following claims.

The invention claimed is:

1. A method for decoding encoded video data, the method comprising:
   determining a motion vector for decoding a first image portion;
   determining a reference image portion for the first image portion using the determined motion vector; and
   decoding the first image portion based on the reference image portion;
   wherein adaptive motion vector resolution is not used for the first image portion, if the first image portion is decoded according to a skip mode; and
   wherein the adaptive motion vector resolution can be used for the first image portion, and motion vector difference of the motion vector for the first image portion has a resolution dependent on a flag for the first image portion, if the first image portion is decoded according to a motion vector prediction mode using the motion vector difference, wherein options of resolutions in the adaptive motion vector resolution include a half pixel resolution.

2. The method according to claim 1, further comprising a step of extracting from the encoded video data the flag.

3. The method according to claim 2, wherein the flag is extracted from the encoded video data only if the first image portion is to be decoded according to the motion vector prediction mode.

4. The method according to claim 1, wherein the motion vector is determined based on a motion vector predictor selected from a list of motion vector predictor candidates.

5. The method according to claim 1, wherein the first image portion is a prediction unit.

6. The method according to claim 1, wherein the motion vector prediction mode is an Adaptive Motion Vector Prediction mode.

7. A device for decoding encoded video data, the device comprising at least one processor configured for carrying out steps of:
   determining a motion vector for decoding a first image portion;
   determining a reference image portion for the first image portion using the determined motion vector; and
   decoding the first image portion based on the reference image portion;
   wherein adaptive motion vector resolution is not used for the first image portion if the first image portion is decoded according to a skip mode; and
   wherein the adaptive motion vector resolution can be used for the first image portion, and motion vector difference of the motion vector for the first image portion has a resolution dependent on a flag for the first image portion, if the first image portion is decoded according to a motion vector prediction mode using the motion vector difference, wherein options of resolutions in the adaptive motion vector resolution include a half pixel resolution.

8. A non-transitory computer-readable storage medium storing instructions of a computer program for implementing a method according to claim 1.

9. A method for encoding video data, the method comprising:
   determining a motion vector for encoding a first image portion;
   determining a reference image portion for the first image portion using the determined motion vector; and
   encoding the first image portion based on the reference image portion;
   wherein adaptive motion vector resolution is not used for the first image portion, if the first image portion is encoded according to a skip mode; and
   wherein the adaptive motion vector resolution can be used for the first image portion, and motion vector difference of the motion vector for the first image portion has a resolution dependent on a flag for the first image portion, if the first image portion is encoded according to a motion vector prediction mode using the motion vector difference, wherein options of resolutions in the adaptive motion vector resolution include a half pixel resolution.

10. A device for encoding video data, the device comprising at least one processor configured for carrying out steps of:
   determining a motion vector for encoding a first image portion;
   determining a reference image portion for the first image portion using the determined motion vector; and
   encoding the first image portion based on the reference image portion;
   wherein adaptive motion vector resolution is not used for the first image portion if the first image portion is encoded according to a skip mode; and
   wherein the adaptive motion vector resolution can be used for the first image portion, and motion vector difference of the motion vector for the first image portion has a resolution dependent on a flag for the first image portion, if the first image portion is encoded according to a motion vector prediction mode using the motion vector difference, wherein options of resolutions in the adaptive motion vector resolution include a half pixel resolution.

11. A non-transitory computer-readable storage medium storing instructions of a computer program for implementing a method according to claim 9.

* * * * *